United States Patent [19]

Okada et al.

[11] Patent Number: 4,898,456
[45] Date of Patent: Feb. 6, 1990

[54] LIQUID CRYSTAL OPTICAL DEVICE

[75] Inventors: Shinjiro Okada; Osamu Taniguchi, both of Kawasaki; Akira Tsuboyama, Tokyo; Masahiko Enari, Yokohama, all of Japan

[73] Assignee: Canon Kabushiki Kaisha, Tokyo, Japan

[21] Appl. No.: 348,138

[22] Filed: May 5, 1989

Related U.S. Application Data

[63] Continuation of Ser. No. 854,583, Apr. 22, 1986, abandoned.

[30] Foreign Application Priority Data

Apr. 23, 1985 [JP] Japan ................. 60-087084
Apr. 24, 1985 [JP] Japan ................. 60-087828
Apr. 24, 1985 [JP] Japan ................. 60-087829
Apr. 24, 1985 [JP] Japan ................. 60-087830

[51] Int. Cl.$^4$ .............................................. G02F 1/13
[52] U.S. Cl. ............................ 350/350 S; 350/332
[58] Field of Search ............. 350/330, 332, 333, 350 S

[56] References Cited

U.S. PATENT DOCUMENTS

| | | | |
|---|---|---|---|
| 4,367,924 | 1/1983 | Clark et al. | 350/350 S |
| 4,548,476 | 10/1985 | Kaneko | 350/350 S |
| 4,563,059 | 1/1986 | Clark et al. | 350/330 |
| 4,668,051 | 5/1987 | Mourey | 350/350 S |
| 4,693,563 | 9/1987 | Harada et al. | 350/350 S |
| 4,712,873 | 12/1987 | Kanbe et al. | 350/350 S |
| 5,715,688 | 12/1987 | Harada et al. | 350/350 S |

FOREIGN PATENT DOCUMENTS 0123825 7/1985 Japan .

OTHER PUBLICATIONS

N. A. Clark & S. T. Lagerwall, "Submicrosecond Bistable Electro Optic Switching in Liquid Crystals", Appl. Phys. Lett., vol. 36, No. 11, 6/1/1980.
P. H. Lippel & C. Y. Young, "Observation of Optically Induced Molecular Reorientation in Films of Smectic C Liquid Crystals", Appl. Phys. Lett., vol. 43, No. 10, 11/1983.

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

A liquid crystal optical device, comprising: (a) a liquid crystal cell comprising a pair of base plates and a ferroelectric smectic liquid crystal disposed between the base plates and capable of being oriented to one of stable orientation states including a first stable orientation state on one side and a second stable orientation state on the other side under no electric field; (b) means for applying an alternating electric field capable of orienting the ferroelectric smectic liquid crystal oriented to the first stable orientation state to a third stable orientation state and orienting the ferroelectric smectic liquid crystal oriented to the second stable orientation state to a fourth stable orientation state; (c) means for applying a first electric field capable of orienting the ferroelectric smectic liquid crystal to the one side of the stable orientation state and orienting the other stable orientation state selectively depending on an information input; and (d) means for detecting an optical difference between light rays having passed through the ferroelectric smectic liquid crystal oriented to the third stable orientation state and light rays having passed through the ferroelectric smectic liquid crystal oriented to the fourth stable orientation state.

23 Claims, 22 Drawing Sheets

(a)

(b)

(c)

(d)

LIQUID CRYSTAL OPTICAL DEVICE

This application is a continuation of application Ser. No. 854,583 filed Apr. 22, 1986, now abandoned.

BACKGROUND OF THE INVENTION

The present invention relates to a liquid crystal optical device for use in a liquid crystal display device, optical shutter array, etc., and more particularly to a liquid crystal optical device having improved display and driving characteristics.

Hitherto, there has been known a type of liquid crystal device which utilizes a TN (twisted namatic) liquid crystal, as shown in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In this type of liquid crystal device, however, when a matrix electrode structure is to be driven according to a time division scheme, the number of picture elements has been restricted because of generation of crosstalk.

As another type of liquid crystal device, there has been known one comprising a plurality of picture elements each connected and subjected to switching by a thin film transistor switching element. This type of display device involves a problem that forming thin film transistors on a substrate or base plate is difficult and it is also difficult to prepare a large display area of display devices.

In order to obviate the above-mentioned drawbacks of the conventional types of liquid crystal devices, Clark and Lagerwall have proposed the use of a liquid crystal device using a bistable liquid crystal (Japanese Laid-Open Patent Application No. 107216/1981, U.S. Pat. No. 4,367,924, etc.). As the bistable liquid crystal, a ferroelectric liquid crystal having a chiral smectic C (SmC*) phase or H (SmH*) phase is generally used. The ferroelectric liquid crystal has bistability including a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained in further detail hereinafter in connection with the present invention. However, such a ferroelectric liquid crystal device having
bistability can be generally realized when the cell thickness is 2 $\mu$m or less, and a high contrast display cannot be attained with a larger cell thickness.

SUMMARY OF THE INVENTION

An object of the present invention is, in view of the above mentioned circumstances, to provide a liquid crystal optical device having improved display and driving characteristics.

According to the present invention, there is provided a liquid crystal optical device comprising: (a) a liquid crystal cell comprising a pair of base plates and a ferroelectric smectic liquid crystal disposed between the base plates and capable of being oriented to one of stable orientation states including a first stable orientation state on one side and a second stable orientation state on the other side under no electric field; (b) means for applying an alternating electric field capable of orienting the ferroelectric smectic liquid crystal oriented to the first stable orientation state to a third stable orientation state and orienting the ferroelectric smectic liquid crystal oriented to the second stable orientation state to a fourth stable orientation state; (c) means for applying a first electric field capable of orienting the ferroelectric smectic liquid crystal to said one side of stable orientation state and orienting the other stable orientation state selectively depending on an information input; and (d) means for detecting an optical difference between light rays having passed through the ferroelectric smectic liquid crystal oriented to said third stable orientation state and light rays having passed through the ferroelectric smectic liquid crystal oriented to said fourth stable orientation state.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Liquid crystal material particularly suited for the present invention are chiral smectic liquid crystals showing ferroelectricity. More specifically, liquid crystals in chiral smectic C phase (SmC*), chiral smectic G phase (SmG*), chiral smectic F phase (SmF*), chiral smectic I phase (SmI*) or chiral smectic H phase (SmH*), may be used.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980 "Submicrosecond Bistable Electrooptic Switching in Liquid Crystals"; Kotai Butsuri (Solid State Physics)" 16 (141), 1981 "Liquid Crystals", etc. In the present invention, ferroelectric liquid crystals disclosed in these publications may be used.

Examples of ferroelectric liquid crystal compounds include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)butyl resorcylidene-4'-octylaniline (MBRA8), and those used in the examples appearing hereinafter.

Particularly preferred ferroelectric liquid crystals may be those showing cholesteric phase on a higher temperature side, including phenyl ester-type liquid crystals shown in the Examples described hereinafter.

Further, it is possible to use chiral smectic liquid crystals having a negative dielectric anisotropy.

When a device is constructed by using these materials, the device may be supported if desired with a block of copper, etc., in which a heater is embedded in order to realize a temperature condition where the liquid crystal compound assumes a desired phase.

Figure 1:
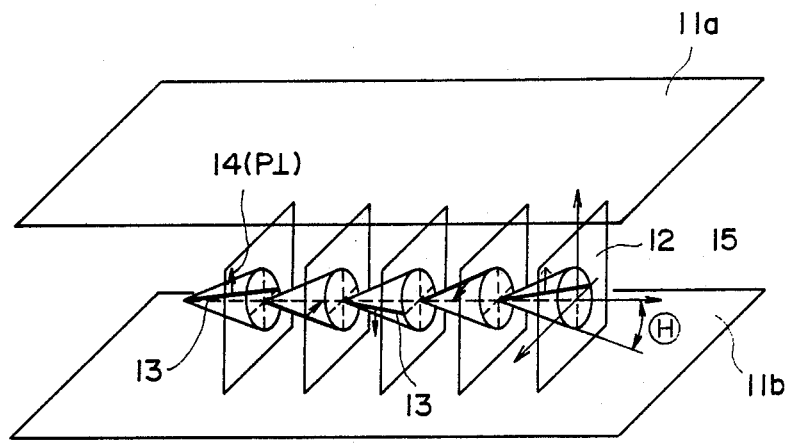
FIG. 1 is a schematic perspective view of a device using a ferroelectric smectic liquid crystal forming a spiral structure in the absence of electric field.

Referring to FIG. 1, there is schematically shown an example of a ferroelectric liquid crystal cell for explanation of the operation thereof. Hereinbelow, SmC* is taken as a desired phase. Reference numerals 11a and 11b denote base plates (glass plates) on which a transparent electrode of, e.g., $In_2O_3$, $SnO_2$, ITO (Indium-Tin-Oxide), etc., is disposed respectively. A liquid crystal of SmC* phase in which liquid crystal molecular layers 12 are oriented perpendicular to surfaces of the glass plates is hermetically disposed therebetween. Full lines 13 show liquid crystal molecules, which successively form spirals with axes 15 extending in parallel with the faces of the base plates 11a and 11b. The angle between a spiral axis 15 and a liquid crystal molecule 13 is defined as ⊕. Each liquid crystal molecule 13 has a dipole moment (P⊥) 14 in a direction perpendicular to the extension thereof. When a voltage Ea higher than a certain threshold level is applied between electrodes formed on the base plates 11a and 11b through terminals 21a and 21b, the spiral structure of the liquid crystal molecules 13 is loosened or unwound to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device having variable optical characteristics depending upon the polarity of an applied voltage.

Figure 2:
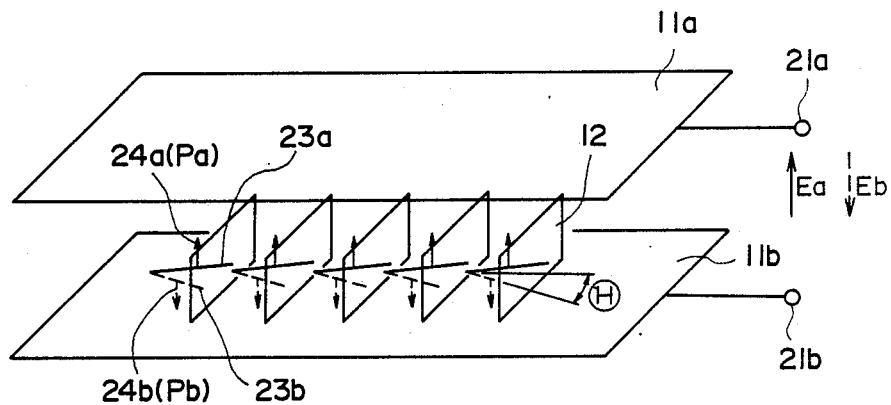
FIG. 2 is a schematic perspective view of a device using a ferroelectric liquid crystal forming a non-spiral structure under electric field used in the present invention.

The liquid crystal layer in the liquid crystal device of the present invention may be rendered sufficiently thin in thickness (e.g., less than 10 μm). Such that the spiral structure of the liquid crystal molecules is loosened to form a non-spiral structure even in the absence of an electric field whereby the dipole moment assumes either of the two states, i.e., P in an upper direction 24a or Pb in a lower direction 24b as shown in FIG. 2. One half of the angle between the molecular axis 23a and the molecular axis 23b is referred to as a "tilt angle ( ⊕ )", and the tilt angle ( ⊕ ) is almost equal to one half of the spiral cone ( ⊕ ), when the liquid crystal assumes a spiral structure as shown in FIG. 1. When an electric field Ea or Eb higher than a certain threshold level and different from each other in polarity as shown in FIG. 2 is applied to a cell having the above mentioned characteristics through voltage application means 21a and 21b, the dipole moment is directed either in the upper direction 24a or in the lower direction 24b depending on the vector of the electric field Ea or Eb. Correspondingly, the liquid crystal molecules are oriented in either of a first stable state 23a and a second stable state 23b.

When the above mentioned ferroelectric liquid crystal is used as an optical modulation element, it is possible to obtain two advantages as briefly commented on hereinbefore. Firstly, the response speed is quite fast. Secondly, the orientation of the liquid crystal shows bistability. The second advantage will be further explained, e.g., with reference to FIG. 2. When the electric field Ea is applied to the liquid crystal molecules, they are oriented to the first stable state 23a. This state is maintained stably even if the electric field is removed. On the other hand, when the electric field Eb of which the direction is opposite to that of the electric field Ea is applied thereto, the liquid crystal molecules are oriented to the second stable state 23b, whereby the directions of molecules are changed. This state is similarly maintained stably even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible.

A most serious problem encountered in forming a device using such a ferroelectric liquid crystal has been, as briefly mentioned hereinbefore, that it is difficult to form a cell having a highly uniform monodomain wherein liquid crystal layers having SmC* phase and aligned perpendicular to the base plate phases and the liquid crystal molecules are aligned almost in parallel with the base plate phases.

Incidentally, there has been hitherto known a method of providing a base plate surface with a uniaxial orientation treatment in order to produce a liquid crystal cell of a large picture area. The uniaxial orientation treatment is effected, e.g., by rubbing the base plate face with velvet, cloth, paper, etc., in one direction or by the oblique vapor deposition of SiO or $SiO_2$ on the base plate face.

It has been considered, however, that such a uniaxial treatment is inadequate for a driving method utilizing a so-called "memory characteristic" because a uniaxial treatment such as rubbing or oblique vapor deposition per se hinders the bistability of the ferroelectric liquid crystal molecules.

According to our further study, it has been found, however, that a specific bistability condition as fully described hereinbelow can be realized by providing a base plate face with an appropriate uniaxial treatment, whereby driving utilizing a memory characteristic can be realized.

Figure 3A:
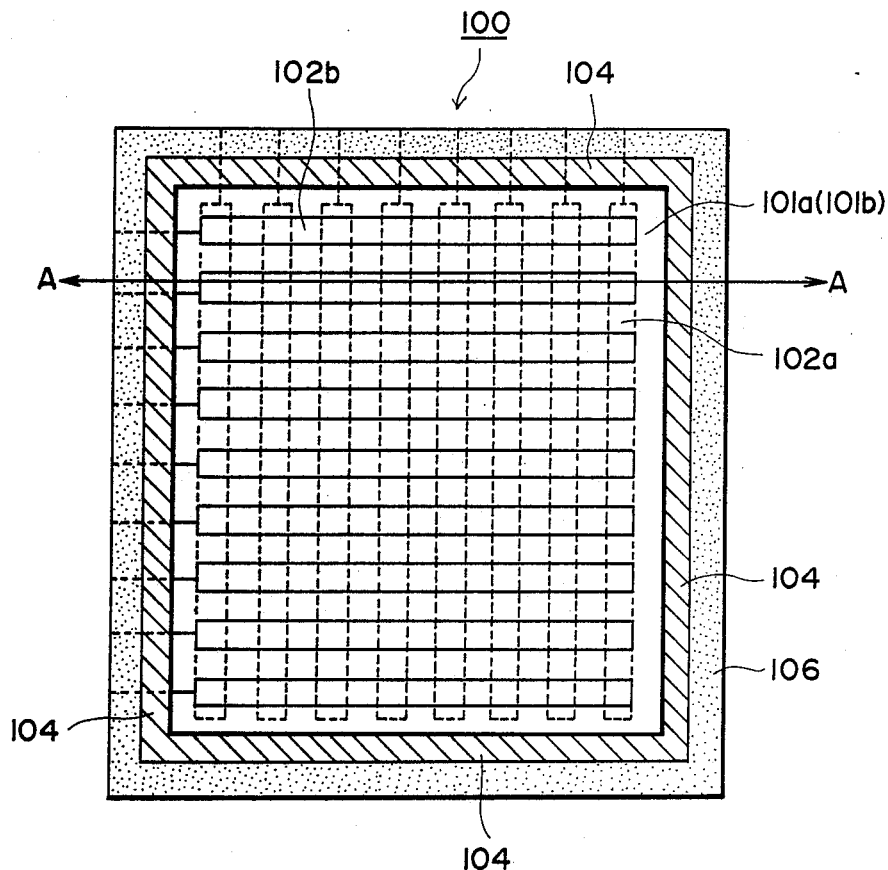
FIG. 3A is a plan view showing an example of the liquid crystal device according to the present invention.
Figure 3B:
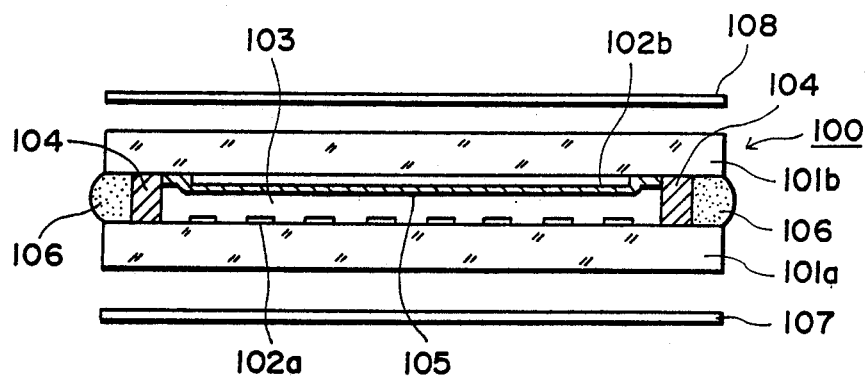
FIG. 3B is a sectional view taken along the line A—A in FIG. 3A.

FIGS. 3A and 3B illustrate an example of the liquid crystal device according to the present invention. FIG. 3A is a plan view of the example and FIG. 3B is a sectional view taken along the line A—A in FIG. 3A.

A cell structure 100 shown in FIG. 3 comprises a pair of base plates 101a and 101b made of glass plates or plastic plates which are held with a predetermined gap with spacers 104 and sealed with an adhesive 106 to form a cell structure. On the base plate 101a is further formed an electrode group (e.g., an electrode group for applying scanning voltages of a matrix electrode structure) comprising a plurality of transparent electrodes in a predetermined pattern, e.g., a stripe pattern. On the base plate 101b is formed another electrode group (e.g., an electrode group for applying signal voltages of the matrix electrode structure) comprising a plurality of transparent electrodes 102b crossing the transparent electrodes 102a.

On the base plate 101b with transparent electrodes 102b may be an orientation controlling film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101b by oblique or tilt vapor deposition.

Figure 8:
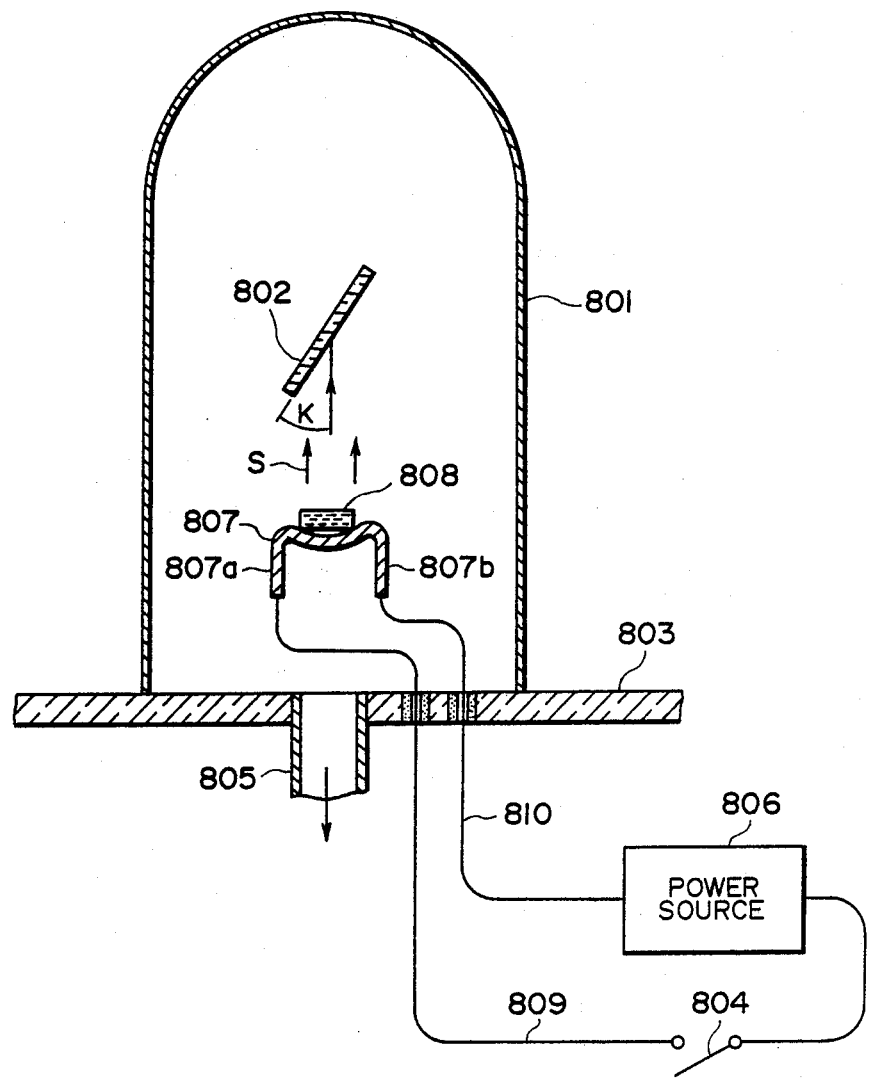
FIG. 8 is a sectional view schematically showing a oblique or tilt vapor deposition apparatus for use in production of the liquid crystal device according to the present invention.

In an apparatus shown in FIG. 8, a bell jar 801 is placed on an insulating base plate 803 provided with a suction hole 805 and the bell jar 801 is made vacuum by operating a vacuum pump (not shown) connected the suction hole 805. A crucible 807 made of tungsten or molybdenum is placed inside and at the bottom of the bell jar 801. In the crucible 807 is placed several grams of a crystal such as SiO, $SiO_2$ or $MgF_2$. The crucible 807 has two downwardly extending arms 807a and 807b, which are respectively connected to lead wires 809 and 810. A power source 806 and a switch 804 are connected in series to the lead wires 809 and 810 outside the bell jar 801. A base plate 802 is disposed inside the bell jar 801 and right above the crucible 807 so that it forms an angle of K with respect to the vertical axis of the bell jar 801.

First, the bell jar 801 is evacuated to a vacuum of about $10^{-5}$ mmHg while the switch 804 is open. Then, the switch 804 is closed to supply power while adjusting an output of the power source 806 until the crucible is heated to an incandescent state of an appropriate temperature for evaporating the crystal 808. About 100 amps. of current is required for giving an appropriate temperature range (700°-1000° C.). The crystal 808 is then evaporated off to form an upward molecular stream denoted by S in the figure. The stream S is incident on the base plate 802 with an angle thereto of K to coat the base plate 802. The angle K is the above mentioned incident angle and the direction of the stream S is the "oblique or tilt vapor deposition direction". The thickness of the film is determined based on the calibration of the thickness with respect to the operation time which is effected prior to the introduction of the base plate 802 into the bell jar 801. After an appropriate thickness of the film is formed, a power supply from the source 806 is decreased, the switch 804 is opened, and the bell jar 801 and the interior thereof are cooled. Then, the pressure in the bell jar is raised to atmospheric pressure and the base plate 802 is taken out from the bell jar 801.

In still another embodiment, the orientation controlling film 105 may be formed by first forming a uniform film of the above-mentioned inorganic or organic insulating material on, i.e., in contact with or above, the base plate 101b and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å to 1μ, especially 500 Å to 5000 Å. The insulating film also has a function of preventing the occurrence of an electric current which is generally caused due to minor quantities of impurities contained in the liquid crystal layer 103, whereby deterioration of the liquid crystal compounds is prevented even upon repeating operations.

In the liquid crystal device according to the present invention, it is possible to form an orientation controlling film similar to the orientation controlling film 105 also on the other base plate 101a.

In the cell structure shown in FIG. 3, the liquid crystal layer 103 may be formed into SmC* phase. The liquid crystal layer 103 is sufficiently thin, so that the liquid crystal molecules do not assume a spiral structure.

Figure 4:
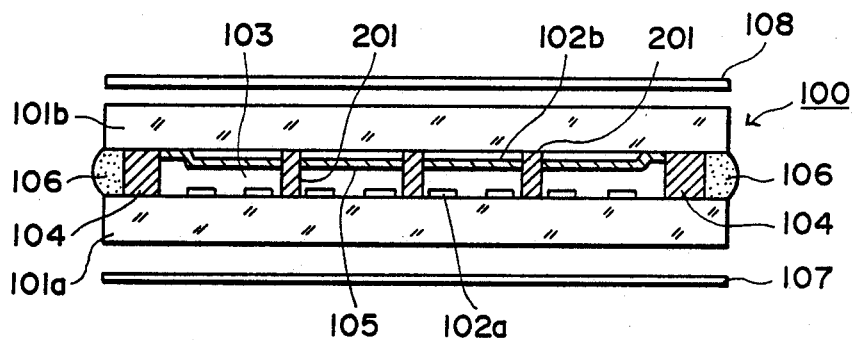
FIG. 4 is a sectional view showing another example of the liquid crystal device according to the present invention.

FIG. 4 shows another embodiment of the liquid crystal device according to the present invention. In the liquid crystal device shown in FIG. 4, a plurality of spacer members 201 are disposed between a pair of base plates 101a and 101b. The spacer members 201 can be provided by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin, and by etching the film to leave the spacer members at appropriate parts.

Such a cell structure 100 having base plates 101a and 101b as shown in FIG. 3 or FIG. 4 is sandwiched between a pair of polarizers 107 and 108 to form an optical modulation device causing optical modulation when a voltage is applied between electrodes 102a and 102b.

Figure 5:
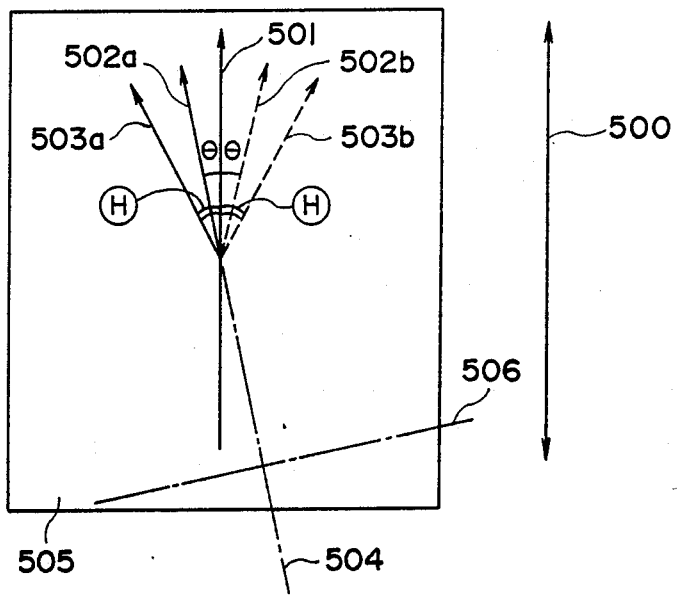
FIG. 5 is a schematic plan view showing stable orientation directions and a direction of uniaxial orientation treatment.

Next, the process for producing the liquid crystal device according to the present invention is explained more specifically, with reference to FIGS. 3 and 5 with the following ester type liquid crystal as an example of the liquid crystal material. The ester type liquid crystal is a three-component mixture having the following composition:

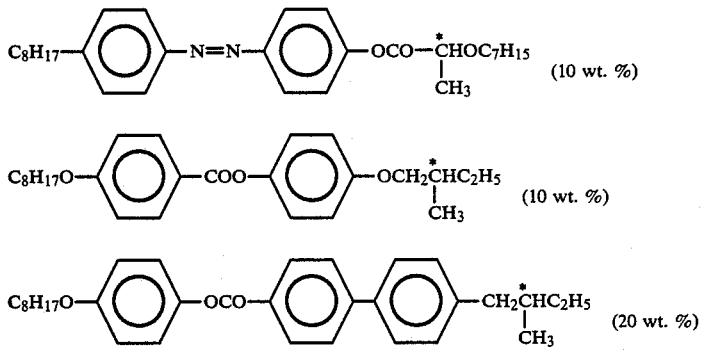

This liquid crystal material shows the following phase transition in the course of temperature decrease:

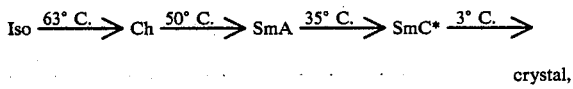

crystal, wherein Iso denotes isotropic phase; Ch, choelsteric phase; and SmA, smectic A phase. When this liquid crystal material is formed in a layer having a sufficiently large thickness, it assumes a spiral structure with a pitch of about 5μ.

First, a cell 100 containing the above-mentioned mentioned ester-type liquid crystal is set in such a heating case (not shown) that the whole cell 100 is uniformly heated therein. Then, the cell 100 is heated to a temperature (about 70° C.) where the liquid crystal in the cell assumes isotropic phase. The temperature of the heating case is gradually decreased, whereby the liquid crystal in the cell 100 is subjected to a temperature decreasing stage. In the temperature decreasing stage, the liquid crystal in the isotropic phase is transformed at about 63° C. into cholesteric phase having a grandjean texture and, on further cooling, transformed from the cholesteric phase to SmA phase, which is a uniaxially anisotropic phase, at about 50° C. At this time, the axes of the liquid crystal molecules in the SmA phase are aligned in the direction of the uniaxial orientation treatment.

Then, the liquid crystal in the SmA phase is transformed into SmC* phase on further cooling, whereby a monodomain of SmC* phase with a non-spiral structure is formed in a thickness of the order of, for example, 6μ.

FIG. 5 schematically shows orientation or alignment states of the liquid crystal molecules as viewed from above the base plate 505.

In the figure, a line 500 corresponds to the direction of a uniaxial orientation treatment, i.e., the rubbing direction in this embodiment. In SmA phase, the liquid crystal molecules are aligned to have an average molecular axis direction 501 corresponding to the rubbing direction. In SmC* phase, the average molecular axis direction is tilted in a direction 502a to form an angle of θ from the rubbing direction 500, thus assuming a first stable orientation state. In this state, when a voltage is applied between the base plates in a direction enhancing the orientation, the average molecular axis of the SmC* phase liquid crystal molecules changes to form an angle larger than θ and is saturated at an angle Ⓗ, thus providing a third stable orientation state. The average molecular axis direction at this time is indicated by a line 503a.

Then, when the voltage is returned to zero, the liquid crystal molecules are again returned to the state having the first molecular axis direction. Accordingly, the liquid crystal molecules have a memory characteristic in the state of the first molecular axis direction 502a. On the other hand, when a voltage in the opposite direction is applied to the liquid crystal molecules having the molecular axis direction 502a and if the voltage is sufficiently high, the average molecular direction of the liquid crystal molecules are transformed into a fourth stable orientation state having an average molecular axis direction 503b providing a saturation angle Ⓗ. Then, where the voltage is again returned to zero, the liquid crystal molecules are placed in a second stable orientation state having an average molecular axis direction 502b forming an angle θ from the rubbing direction. While the molecular alignment states in the thickness direction of a liquid crystal cell under the first and second stable orientation states have not fully clarified as yet, it is assumed that some kind of "twist" is present in the thickness direction. Further, the third and fourth orientation states are considered to correspond to the ideal bistable states explained with reference to FIG. 2.

Accordingly, by aligning the polarization direction 504 of a polarizer with the molecular axis direction 502a forming the angle θ as shown in FIG. 5, it is possible to improve an optical contrast between ON and OFF states when the orientation transformation between the first and second stable orientation states due to application of an electric field as will be explained hereinafter and the memory characteristic, are utilized for driving.

Figures 6, 7:
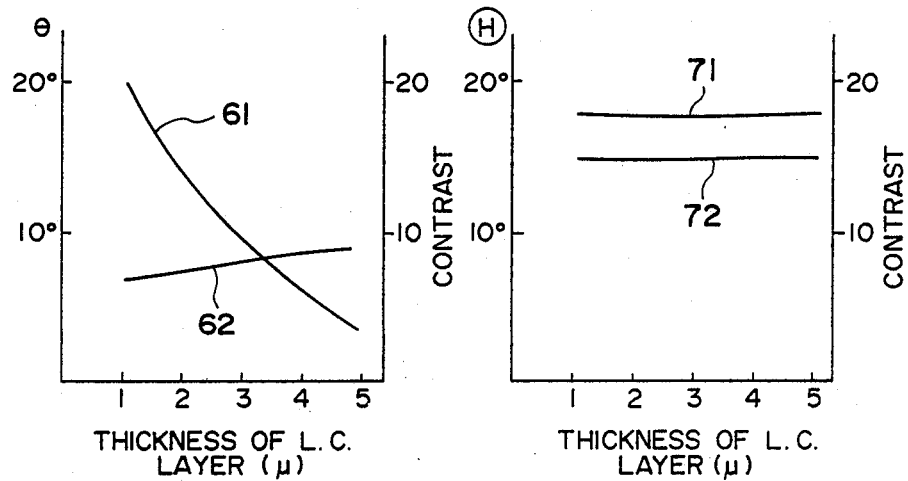
FIG. 6 is an explanatory view showing a relation of a liquid crystal layer thickness, $\theta$ and contrast for a liquid crystal device shown in FIG. 1.
FIG. 7 is an explanatory view showing a relationship of a liquid crystal layer thickness, $\stackrel{\frown}{H}$ and a contrast for a liquid crystal device shown in FIG. 2 according to the present invention.

FIG. 6 shows an example of the dependency of the angle (θ) between the rubbing direction and the average molecular axis direction and of the optical contrast between the states providing the molecular axes 502a and 502b, both on the liquid crystal layer thickness, with respect to the above-mentioned ester type liquid crystal. The curve 61 indicates that the contrast increases as the liquid crystal layer thickness becomes smaller. Further, the curve 62 shows a relation between the angle θ and the layer thickness. The curves are based on the measurement conducted at a temperature 7° C. below the SmA→SmC* phase transition temperature. Further, the angle (Ⓗ) corresponding to the average molecular axis direction under the application of a sufficient electric field (e.g., 20–30 V) was about 15° while it somewhat varied depending on the liquid crystal layer thickness.

Now, when an alternating electric field is applied to the liquid crystal cell as described above having the first and second stable orientation states in parallel with the liquid crystal molecular layers 12, i.e., perpendicularly to the base plates 11a and 11b (or 101a and 101b), the first and second orientation states can be transformed into the third and fourth stable orientation states. It is assumed that the above phenomenon is caused by the fact that the liquid crystal material has a negative dielectric anisotropy. The frequency of the alternating electric field must be so high that the liquid crystal does not respond to the alternating electric field at a prescribed peak-to-peak voltage. At this time, the polarization axis 504 of one polarizer between a pair of polarizers having polarization axes 504 and 506 arranged in cross nicols, is aligned with the average molecular axis direction 503a of the third stable orientation state or the average molecular axis direction 503b of the fourth stable orientation state. The alternating voltage may have a frequency of 400 Hz to 100 KHz and a waveform of triangular wave, sine wave, rectangular wave, etc. The voltage may preferably be of the order of 20 to 100 V in terms of Vpp (peak-to-peak voltage) while it somewhat depends on the liquid crystal layer thickness. The angle Ⓗ apparently increases as the voltage value increases and was saturated at about 15° in this particular example.

FIG. 7 shows the dependency of the angle Ⓗ (line 72) and the contrast (line 71) on the liquid crystal layer thickness when an alternating electric field with rectangular waveforms of 10 KHz and 60 V (as Vpp) was applied. As is apparent in view of the figure, a high contrast can be obtained even in a region of a large cell thickness by utilizing the third and fourth stable orientation states.

In a case where a cell thickness is small, the contrast obtained is of the same order as that obtained in the case of FIG. 6, whereas an advantage of increased light transmittance is attained. For example, in a case of cell thickness being 1μ, the display obtained by utilizing the third and fourth stable orientation states (Ⓗ) provided an amount of transmitted light in a "bright" state which is about three times that obtained by utilizing the first and second stable orientation states (θ).

Hereinbelow, an example of the driving method used for the liquid crystal optical device according to the present invention will be explained.

Figure 9A:
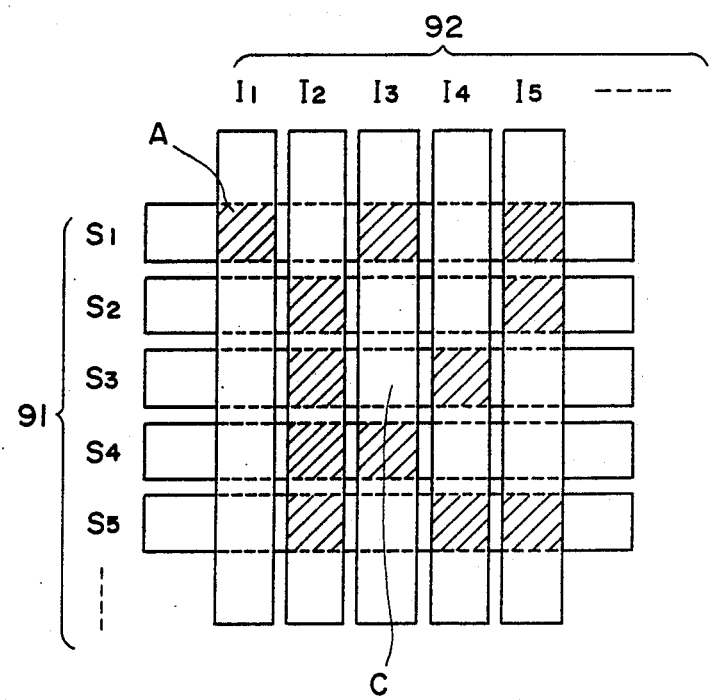
FIG. 9A is a schematic plan view showing an electrode arrangement of a liquid crystal device used in the present invention.
Figure 9B:
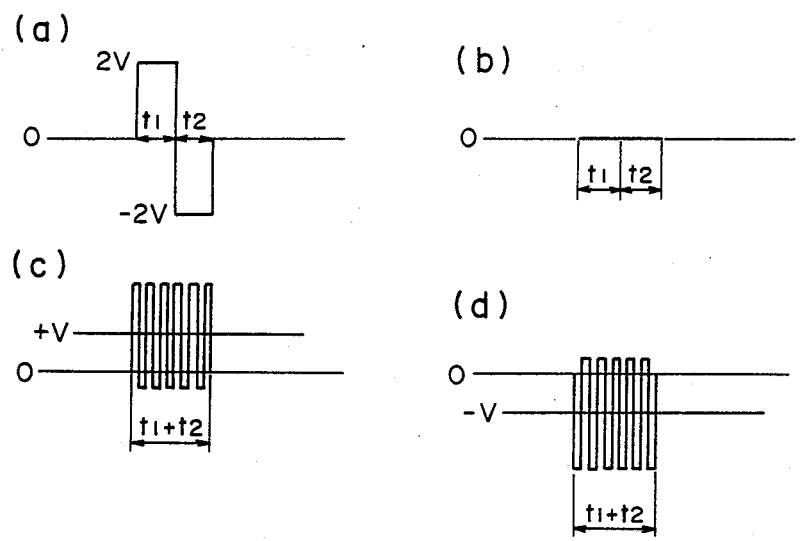
FIG. 9B illustrates waveforms of scanning signals and information signals.
Figure 9C:
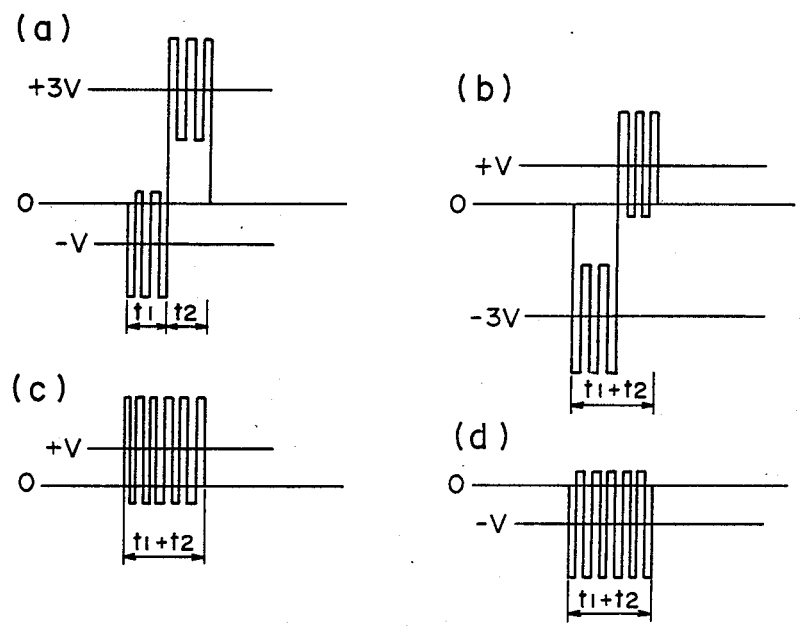
FIG. 9C illustrates voltage waveforms applied to picture elements when signal waveforms shown in FIG. 9B are used.

Referring to FIG. 9A, there is schematically shown a matrix electrode arrangement adapted for display. Reference numerals 91 and 92 respectively denote a group of scanning electrodes and a group of information signal electrodes. FIG. 9B(a) and (b) show signals applied to the scanning electrodes, wherein FIG. 9B(a) shows a scanning selection signal and FIG. 9B(b) shows a scanning non-selection signal. FIG. 9B(c) and (d) show information signals applied to information signal electrodes. They are selectively applied to information signal electrodes respectively depending on writing information inputs. FIG. 9C shows voltage waveforms applied to picture elements by using electric signals shown in FIG. 9B. FIG. 9C(a) and (b) show voltage waveforms applied to picture elements on a scanning line to which a scanning selection signal is applied. The ferroelectric smectic liquid crystal in picture elements to which a voltage waveform shown in FIG. 9C(a) is applied, is oriented at phase $t_2$ to the third stable orientation direction 503a shown in FIG. 5, and the liquid crystal in picture elements to which a voltage waveform shown in FIG. 9C(b) is applied, is oriented at phase $t_1$ to the fourth stable orientation state 503b shown in FIG. 5.

FIG. 9C(c) and (d) respectively show voltage waveforms applied to picture elements to which a scanning selection signal is not applied. The voltages applied to these picture elements are set below a threshold value.

As a result, writing signals shown in FIG. 9B(c) and (d) may be selectively applied in phase with a scanning selection signal to sequentially effect writing for each scanning line. The voltages applied to picture elements after the writing on a selected scanning line are set below a threshold value as shown in FIG. 3C(c) and (d), so that the written states on a scanned line are held or placed in memory for a period of one frame or one field.

Figure 10A:
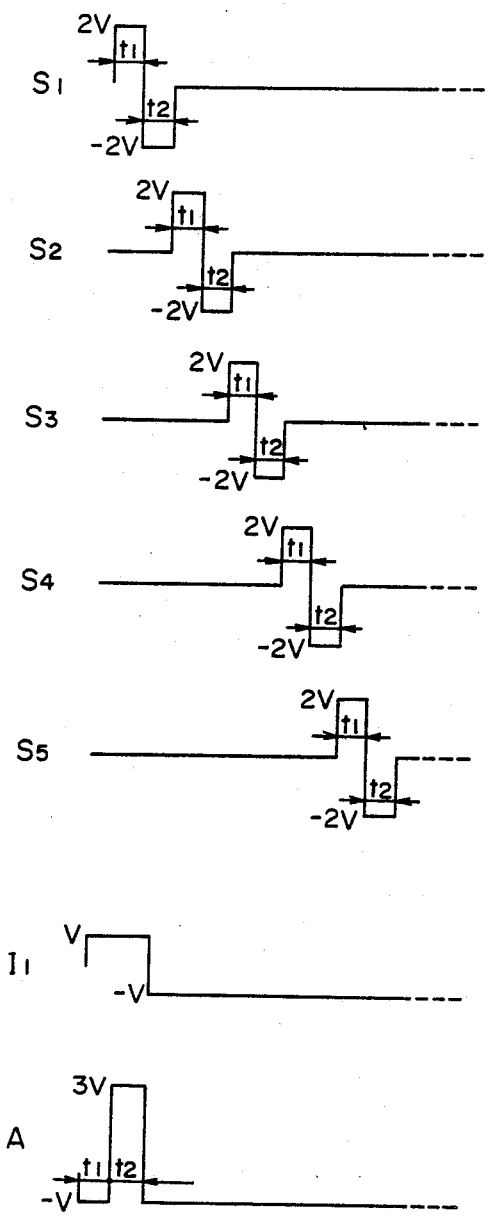
FIG. 10A illustrates time serial waveforms when signal waveforms shown in FIG. 9B are used.
Figure 10B:
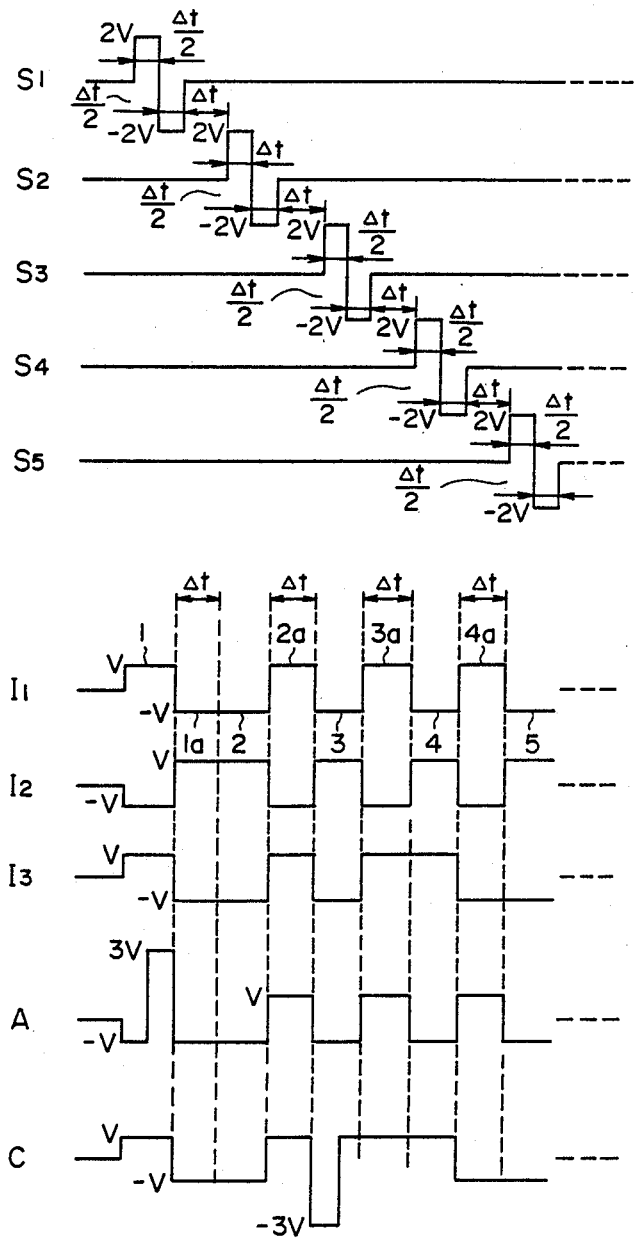
FIG. 10B illustrates another example of time serial waveforms used in the present invention.

FIG. 10A shows time serial signals obtained by applying signals in order to obtain a display state shown in FIG. 9A. In FIG. 10A, high frequency alternating current components provided by superposition on information signals have been omitted from showing. FIG. 10B shows an example of time serial signals wherein an auxiliary signal is provided in phase Δt for preventing crosstalk.

As another embodiment, it is also possible to apply high frequency alternating current components to scanning electrodes. Further, it is also possible to apply high-frequency alternating components to both scanning electrodes and signal electrodes in phase with each other, whereby required withstand voltages of terminal driver ICs for the scanning electrodes and signal electrodes can be lowered.

Figure 11:
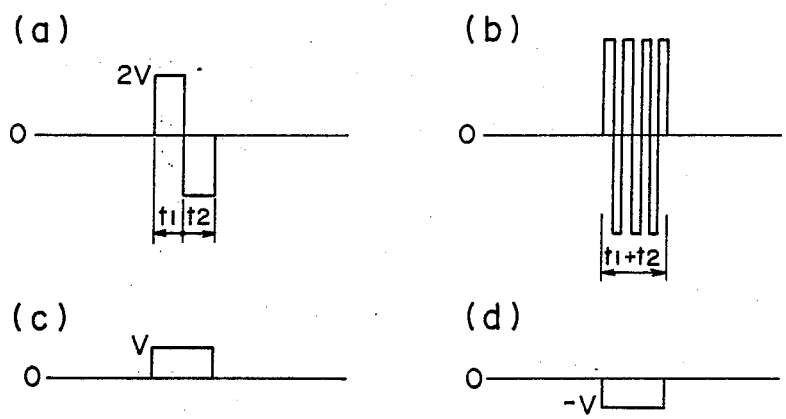
FIG. 11 shows another set of scanning signals and information signals used in the present invention.

FIG. 11 shows still another embodiment wherein an alternating signal is applied as a scanning non-selection signal while the scanning selection signal may be in the same waveform as the one shown in FIG. 9B(a). For selection, the high frequency signal is cut off so that the liquid crystal molecules are placed in a readily mobile state and the switching is made easier. Further, by obviating superposition of a selection signal (a: low frequency component) and a non-selection signal (b: high frequency component), an advantage of lowering the withstand voltage of scanning side driver ICs can be attained.

Figure 12:
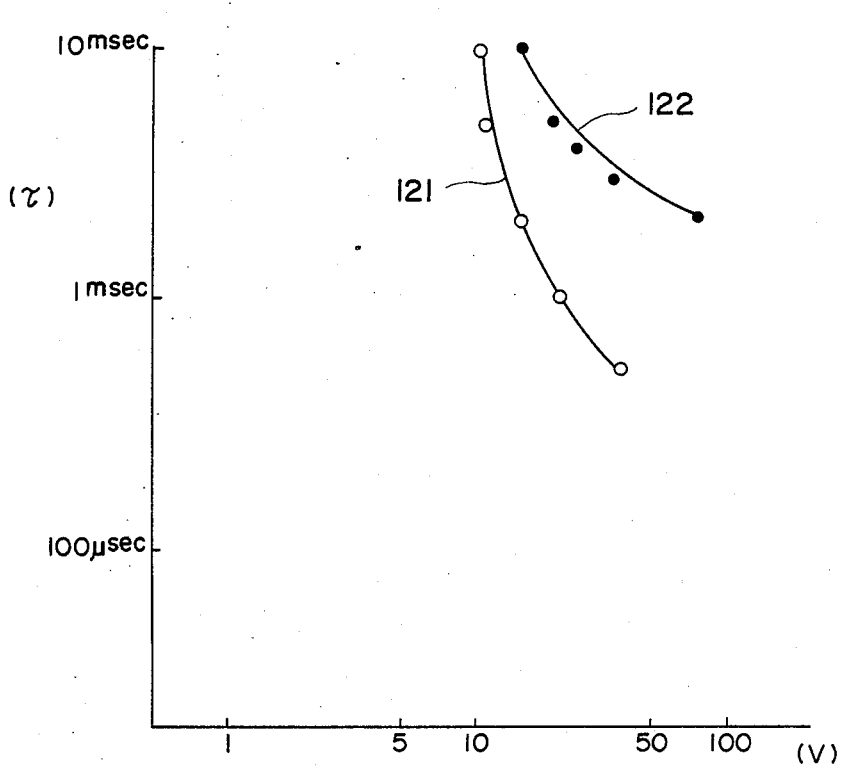
FIG. 12 illustrates a relationship of pulse durations and applied voltages when a ferroelectric smectic liquid crystal device is used.

The liquid crystal material used in this embodiment, if formed in a liquid crystal cell layer thickness of about $6\mu$, provides the first and second stable orientation states when no electric field is applied thereto. FIG. 12 shows comparison of switching characteristics between a case where such a cell state is transformed into a bistability state comprising the third and fourth stable states by the application, and a case where a cell having a large thickness (about $15\mu$) is transformed into a bistability state comprising the third and fourth stable states.

A curve 122 in FIG. 12 shows the results of an experiment wherein a liquid crystal cell having a cell thickness of $15\mu$ showing a ferroelectric liquid crystal of a spiral structure and not substantially showing the first and second stable orientation states in FIG. 5 was subjected to application of a voltage signal as shown in FIG. 9B obtained by superposing a high frequency rectangular alternating voltage of 10 KHz and $\pm 40$ volts (Vpp) to form third and fourth stable orientation states, and voltage values (V) and applied pulse durations ($\tau$) required for causing the switching between the third and fourth stable orientation states. On the other hand, a curve 121 shows the results of an experiment wherein a liquid crystal cell having a cell thickness of $4\mu$ and providing a nonspiral structure including the first and second stable orientation states shown in FIG. 5 was subjected to application of a voltage signal in the same manner as explained above except that a high frequence alternating voltage of 10 KHz and $\pm 20$ volts (Vpp) was used. Accordingly, in FIG. 12, the abscissa represents the voltage value (V, threshold) of driving pulses required for switching, and the ordinate represents the applied pulse durations ($\tau$). In FIG. 12, symbols ◯ denote the measured values obtained by using the 4 $\mu$-thick liquid crystal cell, and by the 15 $\mu$-thick cell. The results of FIG. 12 show the following results:

(1) The 4 $\mu$-thick cell provided a steeper slope. This means that the 4 $\mu$-thick cell is more advantageous for effecting a time-division driving while preventing a crosstalk phenomenon.

(2) The 4 $\mu$-thick cell could be driven by a lower driving voltage. This means that the 4 $\mu$-thick cell allows the use of low withstand voltage IC drivers.

Figure 13:
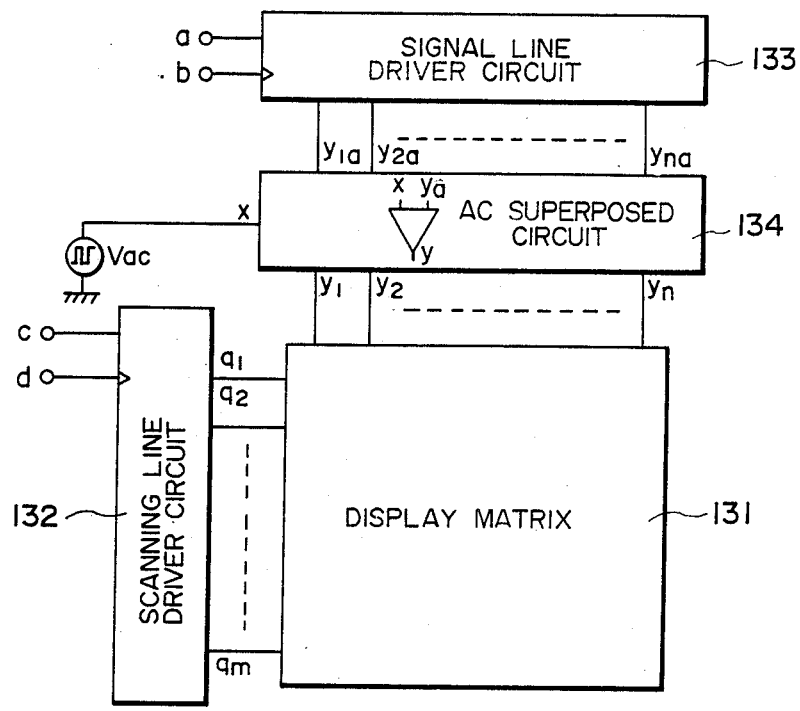
FIGS. 13, 14, 15 and 16 are circuit diagrams used in the present invention.
Figure 14:
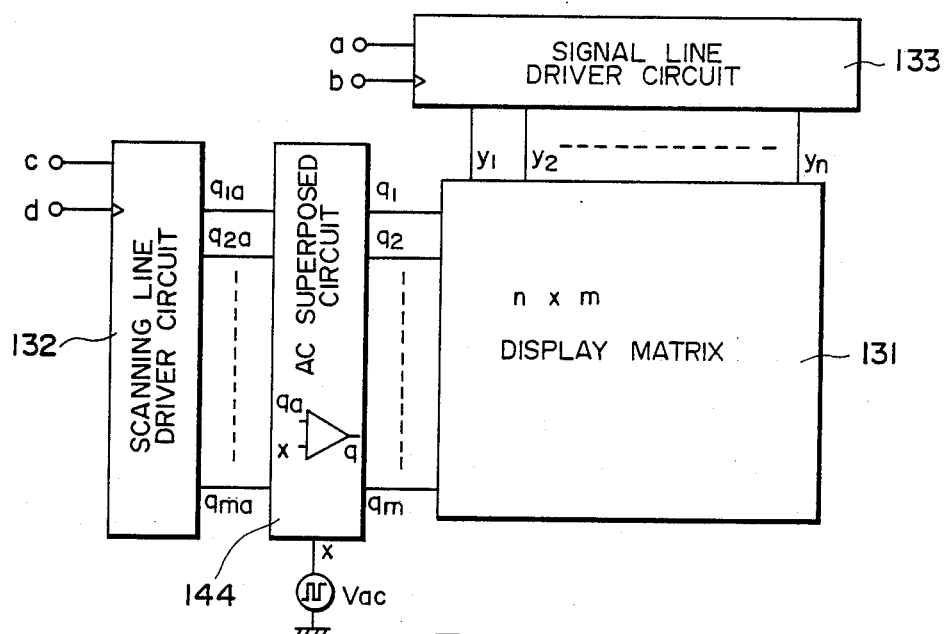

FIG. 13 is a block diagram of a driving circuit for driving an n×m display matrix 131 (n and m: integers), wherein a moduration alternating current component Vac is superposed on the information signal electrode side. The display matrix 131 is driven through information (signal) lines $y_1, y_2, \ldots, y_n$ and scanning lines $q_1, q_2, \ldots, q_m$. Timing pulses are supplied to a scanning line driver circuit 132 through a terminal c, and transfer clock pulses through a terminal d. On the other hand, information signal inputs are supplied to an information (signal) driver circuit 133 through a terminal a, and transfer clock pulses through a terminal b. Outputs are sent through outputs lines $y_{1a}, y_{2a}, \ldots, y_{na}$ and superposed with a modulation alternating current input x by means of a modulation AC component superposed circuit 134, from which outputs $y_1, \ldots, y_n$ are sent through respective output lines. The outputs $y_1, \ldots, y_n$ are produced in the following manner:

$$y_1 = x \oplus y_{1a}$$
$$y_2 = x \oplus y_{2a}$$
$$\vdots$$
$$y_n = x + y_{na},$$

wherein $\oplus$ denotes addition. {FIG. 14 is a block diagram of a driving circuit, wherein a modulation AC component Vac is superposed on the scanning line side. The same reference numerals denote the same members as shown in FIG. 13. A modulation AC input x (Vac) is added to outputs $q_{1a}, q_{2a}, \ldots, q_{ma}$ from a scanning line driver circuit 132 by means of a modulation AC superposed circuit to produce outputs $q_1, q_2, \ldots, q_m$ in the following manner:

$$q_1 = x \oplus q_{1a}$$
$$q_2 = x \oplus q_{2a}$$
$$\vdots$$
$$q_m = x + q_{ma}.$$

Figure 15:
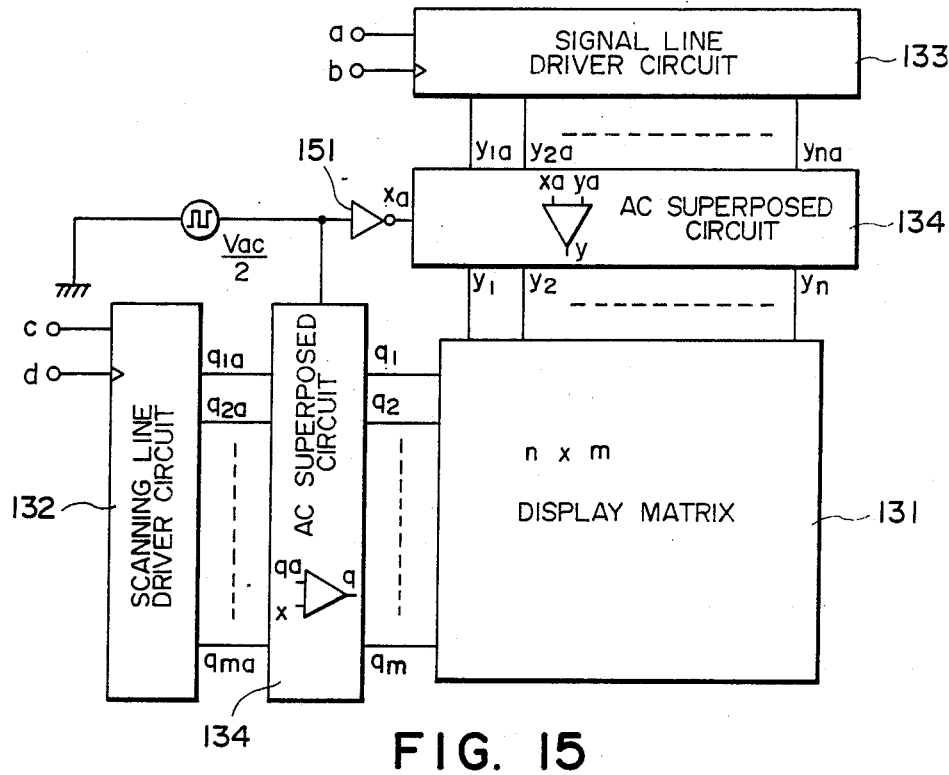

FIG. 15 is a block diagram of a driving circuit, wherein a modulation AC component Vac/2 is superposed on both the information (signal) electrode side and the scanning electrode side, so that a modulation AC component Vac is provided to respective picture elements. The modulation AC component x (Vac/2) is shifted by 180° in phase to form a modulation component $x_a$ which is then supplied to an AC superposed circuit 134.

Figure 16:
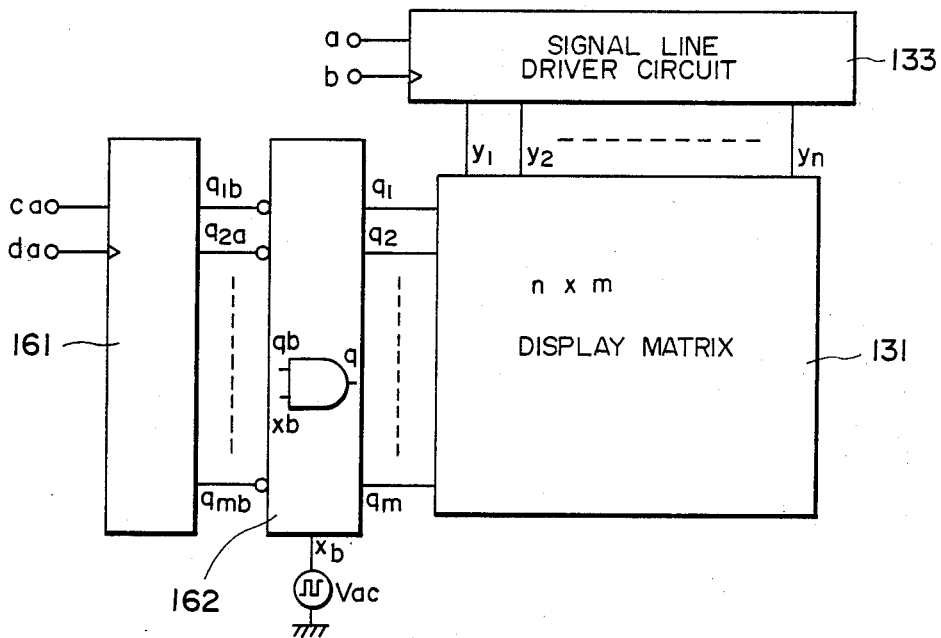

FIG. 16 is a block diagram of a driving circuit, wherein a modulation signal is cut off at a selected time. The driving circuit includes a shift resister 161 to which timing inputs are supplied through a terminal $c_a$ and transfer clock pulse inputs are supplied through a terminal $d_a$. The outputs from the shift register 161 are supplied to an AND gate 162, wherein an input $x_b$ cannot be passed only when an input $q_b$ ($q_{1b}, q_{2a}, \ldots, q_{mb}$) is negative to provide a reference level. More specifically, the following outputs $q_1, q_2, \ldots, q_m$ are produced.

$$x_b \text{ AND } q_{1b} = q_1$$
$$x_b \text{ AND } q_{2b} = q_2$$
$$\vdots$$
$$x_b \text{ AND } q_{2m} = q_m.$$

Figure 17A:
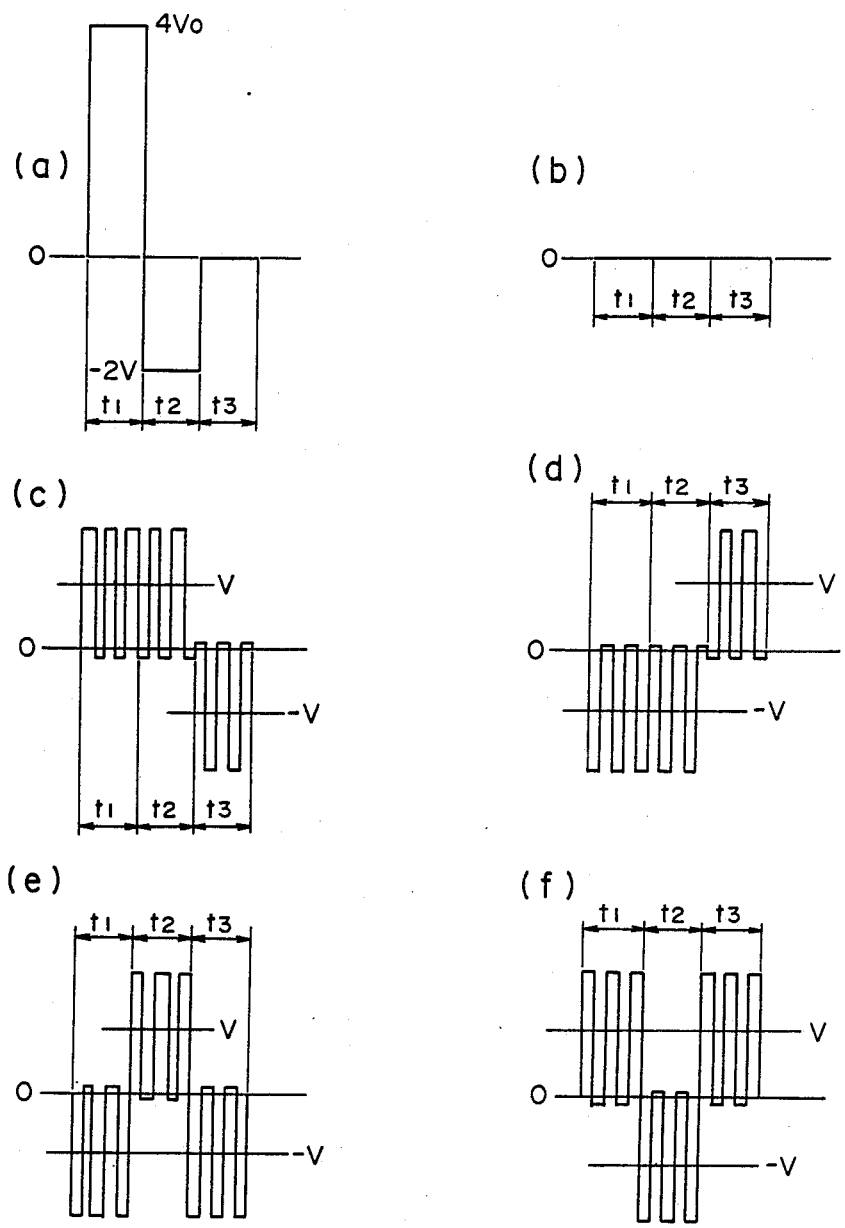
FIG. 17A illustrates another set of scanning signals and information signals used in the present invention.

FIG. 17 shows a set of signals used in the present invention for providing a display state shown in FIG. 9. FIG. 17A(a) and (b) show an electric signal applied to a selected scanning electrode and an electric signal applied to a non-selected scanning signals.

In this embodiment, an auxiliary signal is applied in phase $t_3$. The optimum duration of the auxiliary signal phase $t_3$ may also depend on the magnitude of the voltage applied to the signal electrodes in this phase, but in generally, it is preferred that $t_3$ is shorter if the voltage is larger and larger if the voltage is smaller, in a case where the auxiliary signal has a voltage polarity opposite to that of a voltage applied in a preceding information signal application phase $t_2$. If the duration is long, however, a long time is required for scanning the whole picture area. For this reason, it is preferred that the duration $t_3$ is set to satisfy the relationship of $t_3 \leq t_2$.

FIG. 17A(c)-(f) show information signals applied to signal electrodes. Referring to the figure, it is assumed that signals shown at (d) and (e) are applied to picture elements displaying "black" (corresponding to the third stable orientation 503a in FIG. 5) and signals shown at (c) and (f) are applied to picture elements displaying "white" (corresponding to the fourth stable orientation 503b in FIG. 5) due to application of previous signals. By the application of the signals at (c) and (e), $V_0$ corresponding to "black" is applied at phase $t_2$ as an information signal, and by the application of signals at (d) and (f), $-V_0$ corresponding to "white" is applied at phase $t_2$. Further, phase $t_1$ is a phase for refreshing (N+m)th line (m is an integer such as 1, 2, 3, ...), when the Nth is a scanning line.

Figure 17B:
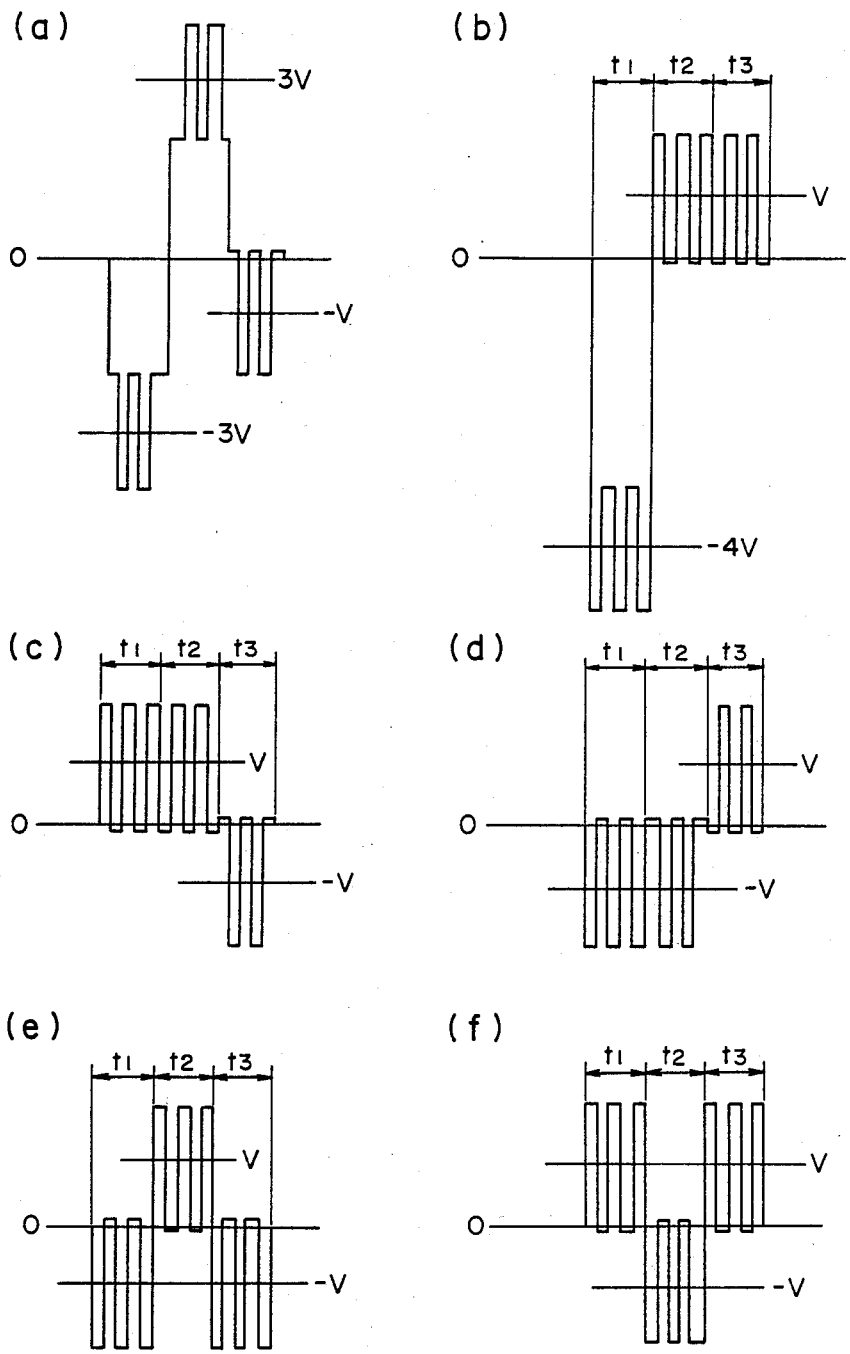
FIG. 17B illustrate voltage waveforms applied to picture elements when signal waveforms shown in FIG. 17A are used.

FIG. 17B shows synthetic waveforms from the scanning signals and the information signals shown in FIG. 17A. More specifically, FIG. 17B(a) shows a waveform synthesized from the scanning selection signal shown in FIG. 17A(a) and the information signal shown in FIG. 17A(c); FIG. 17B(b), from the above mentioned information selection signal and the information signals shown in FIG. 17A(d); and FIG. 17B(c)-(f), from the scanning non-selection signal shown in FIG. 17A(b) and the information signals shown in FIG. 17A(c)-(f), respectively.

Figure 18:
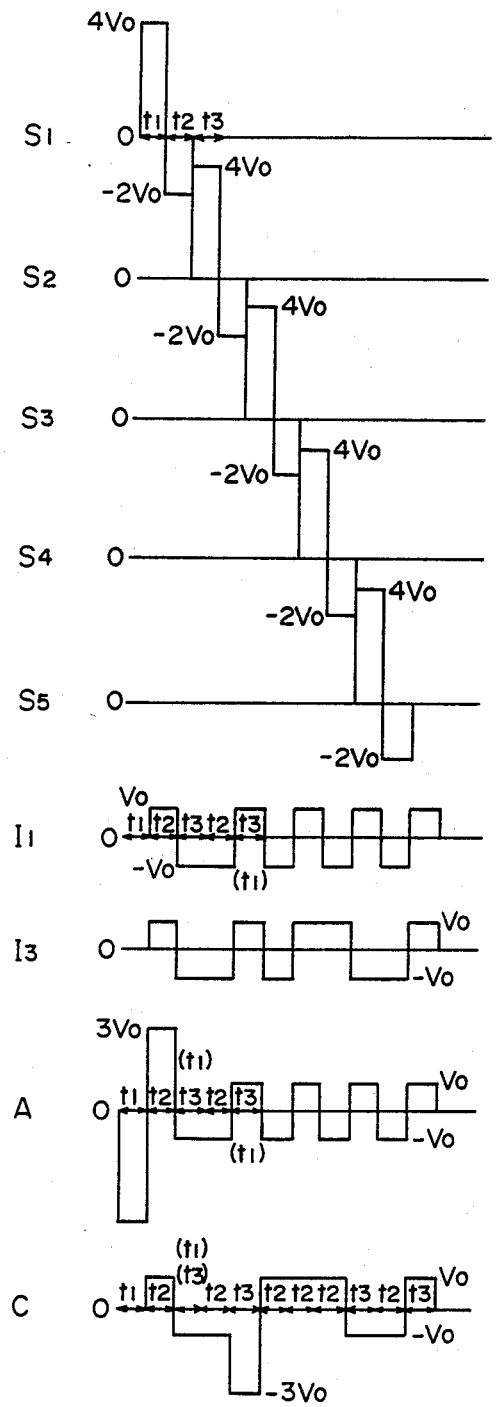
FIG. 18 illustrates time serial waveforms when signal waveforms shown in FIG. 17A are used.

FIG. 18 illustrate time serial signal waveforms using signals shown in FIG. 17A. In FIG. 18, signals at $S_1$-$S_5$ are those applied to the corresponding scanning electrodes $S_1$-$S_5$ in FIG. 9, and signals at $I_1$ and $I_3$ are those applied to the corresponding signal electrodes $I_1$ and $I_3$. As a result, voltage waveforms shown at A and C are applied to the corresponding picture elements A and C in FIG. 9. In FIG. 18, high frequency AC components provided by superposition on information signals are omitted from showing.

As another embodiment, it is also possible to apply high frequency AC components to scanning electrodes. Further, it is also possible to apply high frequency AC components to both scanning electrodes and signal electrodes in phase with each other, whereby required withstand voltages of terminal driver ICs for the scanning electrodes and signal electrodes can be lowered.

Figure 19:
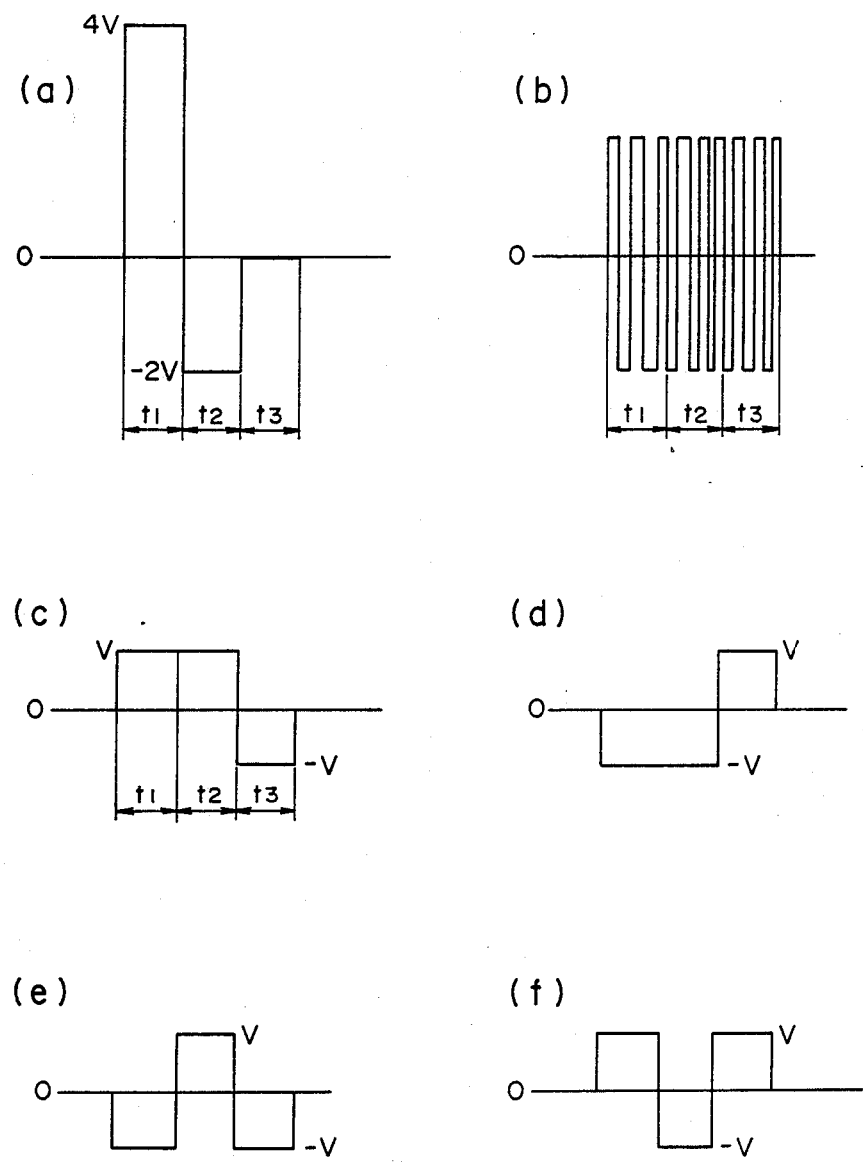
FIG. 19 shows still another set of scanning signals and information signals used in the present invention.

FIG. 19 shows still another embodiment. In this embodiment, an AC signal is applied as a scanning non-selection signal while the scanning selection signal at (a) is in the same waveform as the one shown at FIG. 17B(a). In this embodiment, an advantage as explained with reference to FIG. 11 can be attained.

By using the above-mentioned ester-type liquid crystal material in the embodiments shown in FIGS. 17-19, switching characteristic similar to those shown in FIG. 12 can be obtained.

Figure 20A:
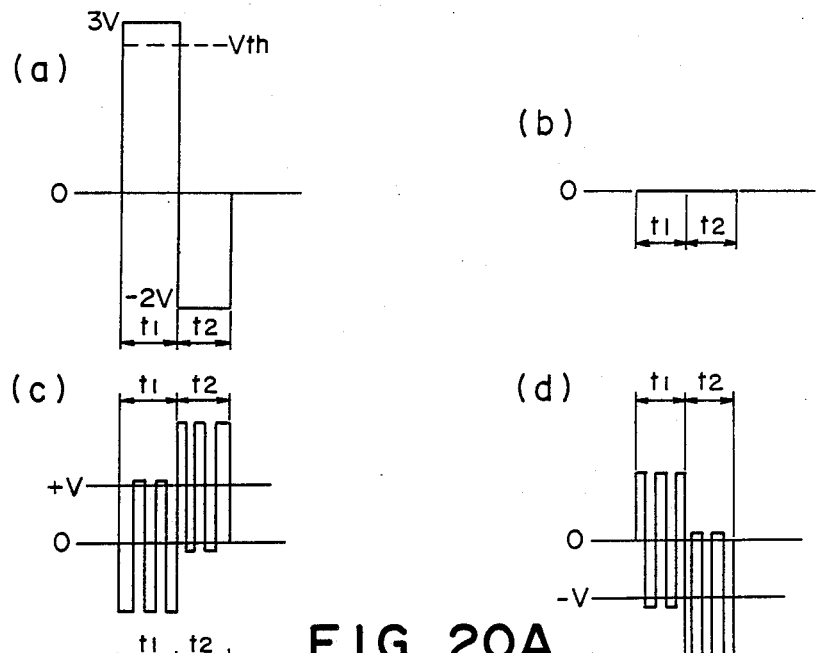
FIG. 20A illustrates another set of scanning signals and information signals used in the present invention.
Figure 20B:
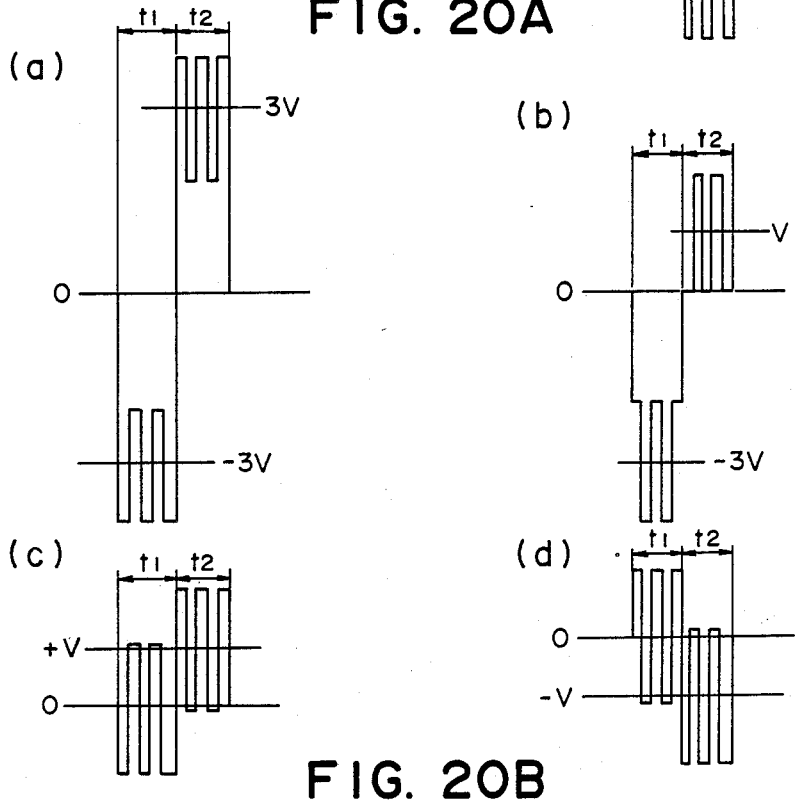
FIG. 20B illustrate voltage waveforms applied to picture elements when signal waveforms shown in pigure 20A are used.

FIGS. 20A and 20B shows another set of signal waveforms used for driving the liquid crystal device according to the present invention. FIG. 20A(a) and (b) show signals applied to the scanning electrodes, wherein FIG. 20A(a) shows a scanning selection signal and FIG. 20A(b) shows a scanning non-selection signal. FIG. 20A(c) and (d) show information signals applied to information signal electrodes. They are respectively selectively applied to information signal electrodes respectively depending on writing information inputs. FIG. 20B shows voltage waveforms applied to picture elements by using electric signals shown in FIG. 20A. FIG. 20B(a) and (b) show voltage waveforms applied to picture elements on a scanning line to which a scanning selection signal is applied, whereby the ferroelectric smectic liquid crystal at all or prescribed picture elements on the scanning line is oriented at phase $t_1$ to the third stable orientation direction (e.g., corresponding to "black" state). Thus, these picture elements are refreshed. At phase $t_2$, a "white" state is written in selected picture elements among the picture elements which have been refreshed to "black" corresponding to information inputs. More specifically, at picture elements to which a voltage waveform shown in FIG. 20B(a) is applied, the ferroelectric liquid crystal is oriented from the third orientation direction 503a to the fourth orientation direction 503b in FIG. 5 corresponding to the "white" state. At picture elements other than those to be written in "white" a voltage waveform as shown in FIG. 20B(b) is applied, the "black" state is formed since the voltage applied at phase $t_2$ is below the threshold value.

FIGS. 20B(c) and (d) respectively show voltage waveforms applied to the picture elements to which a scanning non-selection signal is not applied. The voltages applied to these picture elements are set below the threshold.

As a result, by applying writing signal shown in FIGS. 9 selectively in phase with a scanning selection signal, sequential writing for each scanning line can be effected. After the writing at picture elements on a scanning line, the voltages set below the threshold as shown in FIG. 20B (c) and (d) are applied to the picture elements, so that the written states on the scanned line are placed in memory for a period of one frame or one field.

Figure 21A:
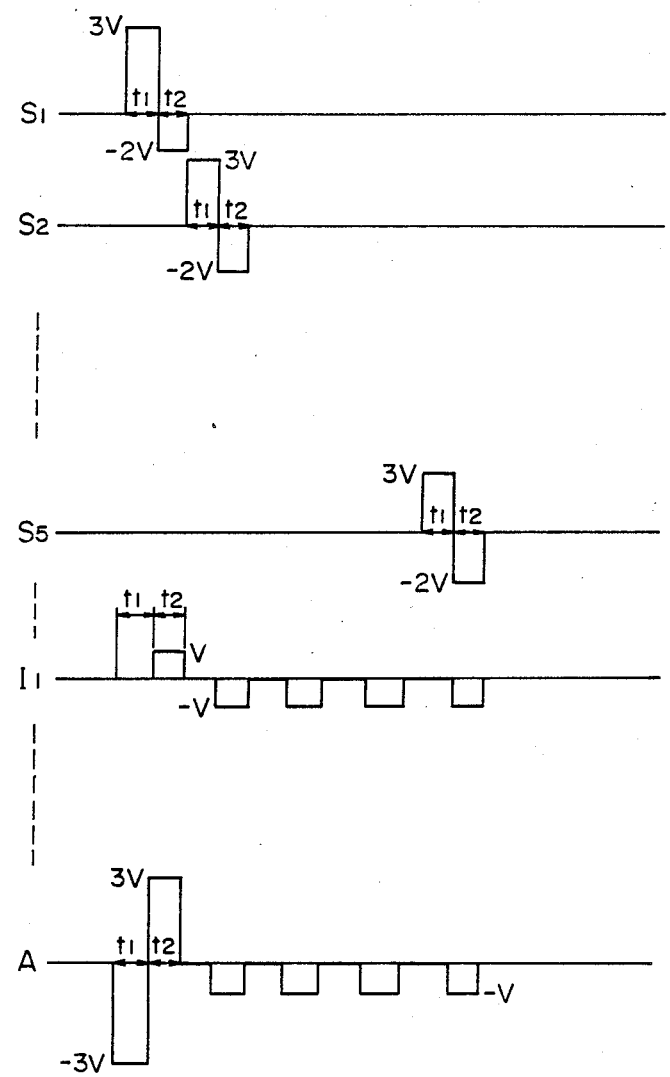
FIG. 21A illustrates time serial waveforms when signal waveforms shown in FIG. 20A are used.
Figure 21B:
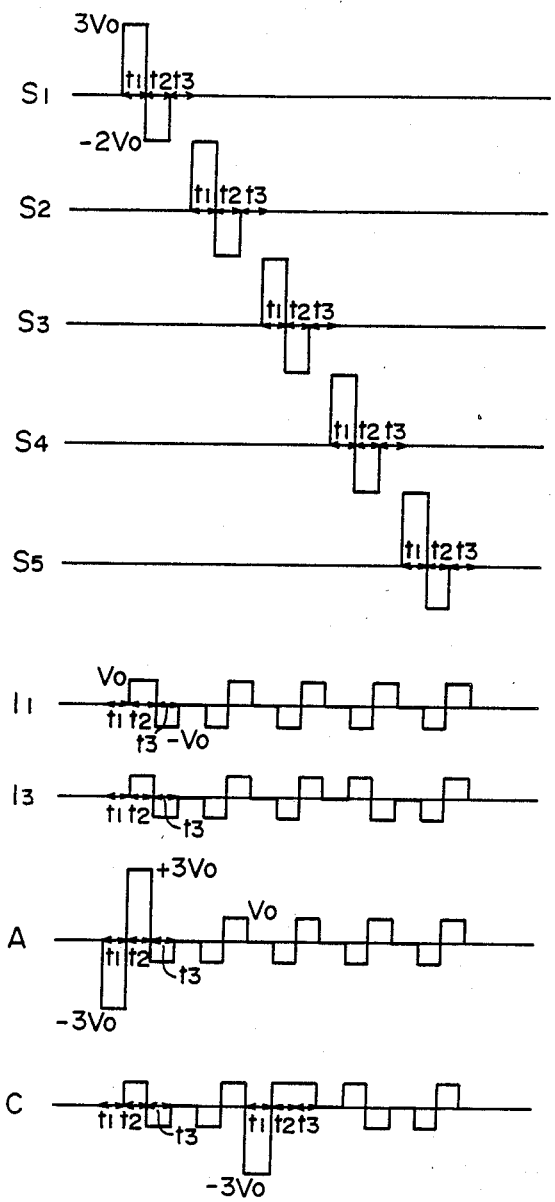
FIG. 21B illustrates another set of time serial waveforms used in the present invention.

FIG. 21A shows time serial signals obtained by applying the above mentioned signals in order to obtain a display state shown in FIG. 9A. In FIG. 21A, high frequency AC components superposed on information signals are omitted from showing for simplicity. FIG. 21B shows an example wherein an auxiliary signal is provided in phase $t_3$ for preventing crosstalk.

As explained in connection with the embodiment of FIGS. 9 and 10, the AC components may alternatively be applied to the scanning electrode side or may be applied to both scanning electrodes and signal electrodes.

Figure 22:
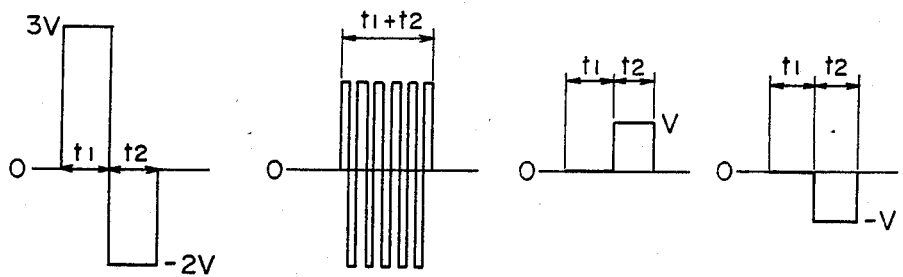
FIG. 22 shows still another set of scanning signals and information signals used in the present invention.

FIG. 22 shows still another embodiment. In this embodiment an AC signal is applied as a scanning non-selection signal while the scanning selection signal at (a) is in the same waveform as the one shown at FIG. 20A(a). In this embodiment, an advantage as explained with reference to FIG. 11 can be attained.

By using the above mentioned ester-type liquid crystal material in the embodiments shown in FIGS. 20-22, switching characteristic similar to those shown in FIG. 12 can be obtained.

Figure 23A:
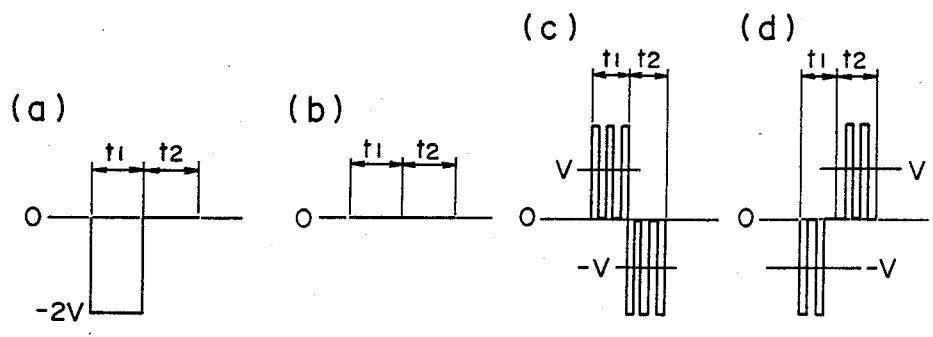
FIG. 23A illustrates another set of scanning signals and information signals used in the present invention.
Figure 23B:
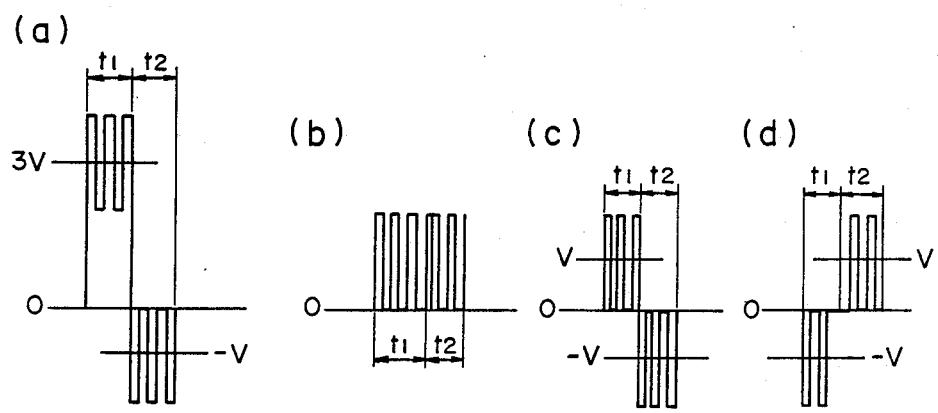
FIG. 23B illustrate voltage waveforms applied to picture elements when signal waveforms shown in FIG. 23A are used.

FIGS. 23A and 23B show still another set of signal waveforms used for driving the liquid crystal device according to the present invention. In FIG. 23A, the signal at (a) is a scanning selection signal; (b), a scanning non-selection signal; (c), an information signal for providing the third stable orientation state; and (d), an information signal providing the fourth stable orientation state.

In FIG. 23B, the signal at (a) is a voltage waveform applied to a picture element for providing the third orientation state; (b), a voltage waveform for the fourth orientation state; and (c) and (d) are voltage waveforms applied to picture elements on non-selected scanning lines.

For simple explanation, a case of displaying binary signals of "white" and "black" is taken as an example. It is assumed that the hatched picture elements in FIG. 9A correspond to "black" and the other picture elements correspond to "white". First, in order to uniformly write "white" in the whole picture, the ferroelectric liquid crystal at the whole picture elements are uniformly oriented to the third stable orientation state. This may be effected by applying a prescribed voltage pulse (e.g., a magnitude of $3V_0$, a duration of $\Delta t$) to all the scanning electrodes. Alternatively, it is also possible to apply a similar electric signal to all the signal electrodes. Further, it is possible to apply such an electric signal as to uniformly orient the ferroelectric liquid crystal at a desired block of picture elements to the third stable orientation state to a desired block of scanning electrodes or signal electrodes. More specifically, such an electric signal may be applied to all the electrodes at a time or may be applied to the electrodes sequentially by scanning. Anyway, after whole the picture is once written in "white", desired picture elements are written in "black" depending on information signals. In FIGS. 23A and 23B, $t_1$ and $t_2$ respectively indicate a phase in which an information signal and a scanning signal is applied and a phase in which an auxiliary signal is applied. In this example, a case of $t_1=t_2=\Delta t$ is shown.

Now, if it is assumed that a threshold voltage for an application time $\Delta t$ for providing the third stable orientation state ("white") is indicated by $-V_{th2}$ (a threshold for providing the first stable orientation state in the absence of an AC electric field) and a threshold voltage for an application time $\Delta t$ for providing the fourth stable orientation state ("black") is indicated by $V_{th1}$ (a threshold for providing the second stable orientation state in the absence of an AC electric field), an electric signal applied to a selected scanning electrode is a voltage as shown in FIG. 23A(a) which is $-2V_0$ at phase time) $t_1$ and 0 at phase (time) $t_2$.

The other scanning electrode are placed in grounded condition as shown in FIG. 23A(b), thus given an electric signal of zero volt. On the other hand, an electric signal applied to a selected signal electrode is $V_0$ at phase $t_1$, and $-V_0$ at phase $t_2$ as shown in FIG. 23A(c). An electric signal applied to a non-selected signal electrode is $-V_0$ at phase $t_1$ and $+V_0$ at phase $t_2$ as shown in FIG. 23A(d). In this instance, the voltage $V_0$ is set to a desired value so as to satisfy $V_0 < V_{th1} < 3V_0$ and $-V_0 > -V_{th2} > -3V_0$.

FIGS. 23B shows voltage waveforms applied to respective picture elements when an electric signal satisfying the above mentioned relationships is given. The voltage waveforms shown in FIGS. 23B(a) and (b) are applied to picture elements respectively written in "black" and "white" on a selected scanning line and the voltage waveforms shown in FIG. 23B(c) and (d) are applied to picture elements on non-selected scanning lines.

In operation, a voltage $3V_0$ exceeding the threshold voltage $V_{th1}$ is applied at phase $t_1$ to picture elements on a scanning line which are to display "black", so that the liquid crystal in the picture elements is brought to the fourth stable orientation state. Further, a voltage $V_0$ not exceeding the threshold voltage $V_{th1}$ is applied at phase $t_1$ to picture elements on the same scanning line which are to display "white" so that the third stable orientation state ("white") is retained.

Figure 24:
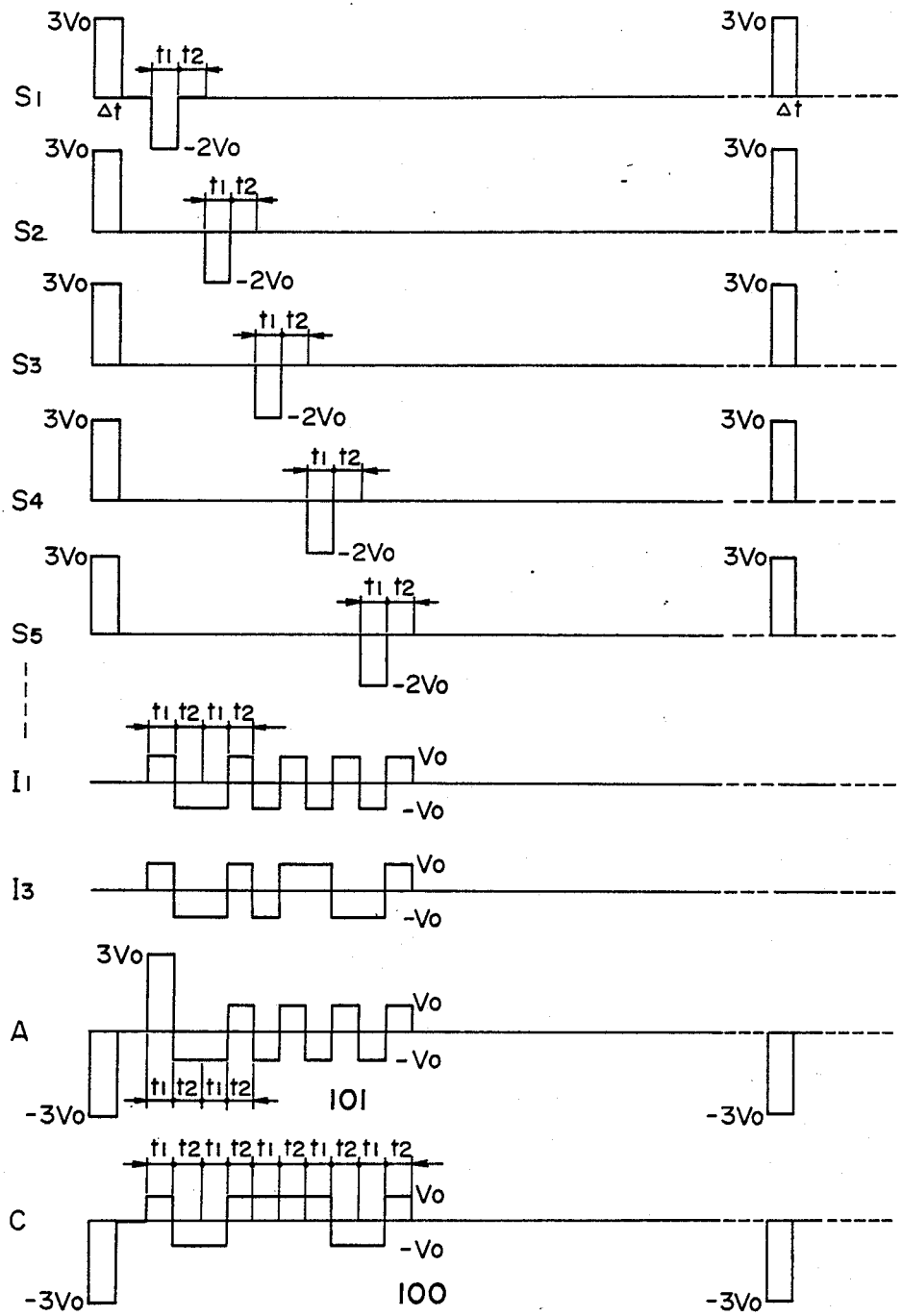
FIG. 24 illustrates time serial waveforms when signal waveforms shown in FIG. 23A are used.

On the other hand, on non-selected scanning lines, a voltage applied to all picture elements C and D is $\pm V$ or zero volt, each being not above the threshold voltage. Accordingly, the liquid crystal molecules in each picture element still retains the orientation corresponding to a signal state produced when they have been last scanned. Thus, when a certain scanning electrode is selected, signal corresponding to one line are written thereinto at phase $t_1$, and the signal states can be maintained even after completion of one frame of operation. FIG. 24 shows the above-mentioned driving signals in series. In FIG. 24, high frequency AC components superposed on the information signals have been omitted from showing. The waveforms at $S_1$–$S_5$ of FIG. 24 are those of electric signals applied to the corresponding scanning electrodes $S_1$–$S_5$; $I_1$ and $I_3$, electric signals applied to the corresponding signal electrodes $I_1$ and $I_3$; and A and C, the voltage waveforms applied to the picture elements A and C in FIG. 9A.

In this embodiment, the voltage applied at a first phase $t_1$ for writing "black" is $3V_0$ and the application time is $\Delta t$. Further, during non-scanning period, the maximum voltage applied to the respective picture elements is $|\pm V_0|$, and the longest period in which the maximum voltage is applied is $2\Delta t$ at 100 in FIG. 24. Further, the severest condition occurs when the information signal continues in the sequence of white →white →black and the second "white" corresponds to the scanning period, whereas the longest time is restricted to $4\Delta t$ (101) which is short as an application time so that no crosstalk occurs. Thus, after the scanning of one whole picture area has been completed, the displayed information is semipermanently retained so that a refreshing step as used in the conventional display device using a TN liquid crystal is not required at all.

The optimum duration of the second phase $t_2$ may also depend on the magnitude of the voltage applied to the signal electrodes in this phase, but in generally, it is preferred to be shorter if the voltage is larger and longer if the voltage is smaller, in a case where the voltage signal has a voltage polarity opposite to that of a voltage applied in the first phase $t_1$. If the duration is long, however, a long time is required for scanning the whole picture area. For this reason, it is preferred that the duration $t_2$ satisfies the relationship of $t_2 \leq t_1$.

As another embodiment, it is also possible to apply high frequency AC components to scanning electrodes. Further, it is also possible to apply high frequency AC components to both scanning electrodes and signal electrodes in phase with each other, whereby required withstand voltages of terminal driver ICs for the scanning electrodes and signal electrodes can be lowered.

Figure 25:
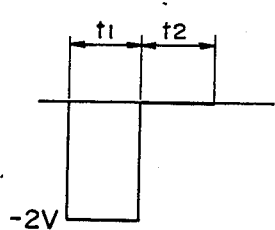
FIG. 25 shows still another set of scanning signals and information signals used in the present invention.
Figure 25:
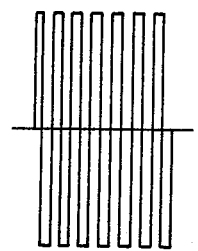
Figure 25:
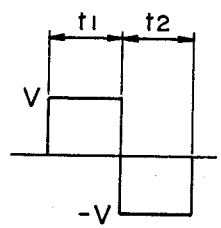
Figure 25:
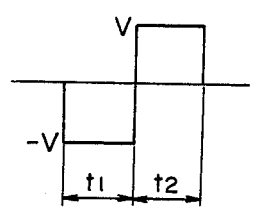

FIG. 25 shows still another embodiment. In this embodiment, an AC signal is applied as a scanning non-selection signal while the scanning selection signal at (a) is in the same waveform as the one shown at FIG. 23A(a). In this embodiment, an advantage as explained with reference to FIG. 11 can be attained.

By using the above-mentioned ester-type liquid crystal material in these embodiments, switching characteristics similar to those shown in FIG. 12 can be obtained.

As explained hereinabove, according to the present invention, a high contrast display characteristic can be attained in a relatively large cell thickness region, and in a case of a small cell thickness, a light transmittance about 3 or more times that obtained without application of an alternating electric field, whereby improved display characteristics can be provided.

What is claimed is:

1. A liquid crystal optical apparatus comprising:
   (a) as liquid crystal cell comprising a pair of electrodes and a ferroelectric smectic liquid crystal having a negative dielectric anisotropy disposed between the electrodes capable of being oriented to a first stable orientation state on one side and a second stable orientation state on the other side of the absence of an electric field, said orientation states forming an angle 2Θ between the average molecular axes of said first and second stable orientation states;
   (b) means for applying between said electrodes a voltage signal sufficient to respectively transform the ferroelectric smectic liquid crystal oriented from the first or second orientation state to the second or first orientation state;
   (c) means for applying between said electrodes in a non-selecting period an alternating voltage which is insufficient to transform the ferroelectric smectic liquid crystal from one to the other of the first and second orientation states but which is sufficient to provide a third stable orientation state and a fourth stable orientation state which form a large angle than said angle 2Θ; and
   (d) means for detecting an optical difference between light rays having passed through the ferroelectric smectic liquid crystal oriented to said third stable orientation state and light rays having passed through the ferroelectric smectic liquid crystal oriented to said fourth stable orientation state.

2. A liquid crystal optical apparatus according to claim 1, wherein said means for detecting an optical difference is a polarizer having a polarization axis substantially in parallel with the molecular axes of the ferroelectric smectic liquid crystal oriented to the third stable orientation state or the fourth stable orientation state.

3. A liquid crystal optical apparatus according to claim 1, wherein said means for detecting an optical difference comprises a pair of polarizers arranged in the form of cross nicols, one of the pair of polarizers having a polarization axis substantially in parallel with the molecular axes of the ferroelectric smectic liquid crystal oriented to the third stable orientation state or the fourth stable orientation state.

4. A liquid crystal optical apparatus according to claim 1, wherein said ferroelectric smectic liquid crystal is in chiral smectic C phase, H phase, I phase, G phase or F phase.

5. A liquid crystal optical apparatus according to claim 1, wherein said pair of electrodes are respectively disposed in plural to form information lines and scanning lines, respectively, and said alternating voltage is applied through the information lines.

6. A liquid crystal optical apparatus according to claim 1, wherein said pair of electrodes are respectively disposed in plural to form information lines and scanning lines, respectively, and said alternating voltage is applied through the scanning lines.

7. A liquid crystal optical apparatus, comprising:
   (a) liquid crystal cell comprising a pair of base plates and a ferroelectric smectic liquid crystal having a negative dielectric anistropy disposed between the base plates capable of being oriented to a first stable orientation state on one side and a second stable orientation state on the other side in the absence of an electric field said orientation states forming an angle 2Θ between the average molecular axes of said first and second stable orientation states;
   (b) matrix electrode means comprising a plurality of scanning lines and a plurality of information lines intersecting with the scanning lines;
   (c) writing pulse application means comprising means for applying a scanning selection signal and means for applying an information signal in synchronism with the scanning selection signal to said matrix electrode means, said writing pulse application means applying an erasure-pulse of one polarity exceeding one threshold of the ferroelectric smectic liquid crystal to all or prescribed picture elements on a selected N-th scanning line in a first phase, applying a writing-pulse of the other polarity exceeding the other threshold of the ferroelectric liquid crystal to a selected picture element among all or prescribed picture elements on said N-th scanning line in a second phase, and applying an erasure-pulse of one polarity exceeding one threshold of the ferroelectric smectic liquid crystal to all or prescribed picture elements on an (N+m)th scanning line simultaneously in said second phase;
   (d) means for applying to the intersections of said scanning lines and information lines an alternating voltage in a non-selecting period which is insufficient to transform the ferroelectric smectic liquid crystal oriented from one to the other of the first and second orientation states but which is sufficient to provide a third stable orientation state and a fourth stable orientation state which form a larger angle than said angle 2Θ; and
   (e) means for detecting an optical difference between light rays having passed through the ferroelectric smectic liquid crystal oriented to said third stable orientation state and light rays having passed through the ferroelectric smectic liquid crystal oriented to said fourth stable orientation state.

8. A liquid crystal optical device according to claim 7, wherein said means for detecting an optical difference is a polarizer having a polarization axis substantially in parallel with the molecular axes of the ferroelectric smectic liquid crystal oriented to the third stable orientation state or the fourth stable orientation state.

9. A liquid crystal optical apparatus according to claim 7, wherein said means for detecting an optical difference comprises a pair of polarizers arranged in the form of cross nicols, one of the pair of polarizers having a polarization axis substantially in parallel with the molecular of the ferroelectric smectic liquid crystal oriented to the third stable orientation state or the fourth stable orientation state.

10. A liquid crystal optical apparatus according to claim 7, wherein said ferroelectric smectic liquid crystal is in chiral smectic C phase, H phase, I phase, G phase or F phase.

11. A liquid crystal optical apparatus, comprising:
   (a) a liquid crystal cell comprising a pair of base plates and a ferroelectric smectic liquid crystal having a negative dielectric anisotropy disposed between the base plates capable of being oriented to a first stable orientation state on one side and a second stable orientation state on the other side forming an angle 2Θ between the average molecular axes of said first and second stable orientation states in the absence of an electric field;
(b) matrix electrode means comprising a plurality of scanning lines and a plurality of information lines intersecting with the scanning lines;
(c) writing pulse application means comprising means for applying a scanning selection signal and means for applying an information signal in synchronism with the scanning selection signal to said matrix electrode means, said writing pulse application means applying an erasure-pulse of one polarity exceeding one threshold of the ferroelectric smectic liquid crystal to all or prescribed picture elements on a selected scanning line in a first phase, and applying a writing pulse of the other polarity exceeding the other threshold of the ferroelectric smectic liquid crystal to a selected picture element among all or prescribed picture elements on said selected scanning line in a second phase;
(d) means for applying to the intersections of said scanning and information lines an alternating voltage in a non-selecting period which is insufficient to transform the ferroelectric smectic liquid crystal oriented from one to the other of the first and second orientation states but which is sufficient to provide a third stable orientation state and a fourth stable orientation state which form a larger angle than said angle 2Θ; and
(e) means for detecting an optical difference between light rays having passed through the ferroelectric smectic liquid crystal oriented to said third stable orientation state and light rays having passed through the ferroelectric smectic liquid crystal oriented to said fourth stable orientation state.

12. A liquid crystal optical apparatus according to claim 11, wherein said means for detecting an optical difference is a polarizer having a polarization axis substantially in parallel with the molecular axes of the ferroelectric smectic liquid crystal oriented to the third stable orientation state or the fourth stable orientation state.

13. A liquid crystal optical apparatus according to claim 11, wherein said means for detecting an optical difference comprises a pair of polarizers arranged in the form of cross nicols, one of the pair of polarizers having a polarization axis substantially in parallel with the molecular axes of the ferroelectric smectic liquid crystal oriented to the third stable orientation state or the fourth stable orientation state.

14. A liquid crystal optical apparatus according to claim 11, wherein said ferroelectric smectic liquid crystal is in chiral smectic C phase, H phase, I phase, G phase or F phase.

15. A liquid crystal optical apparatus, comprising:
(a) a liquid crystal cell comprising a pair of base plates and a ferroelectric smectic liquid crystal having a negative dielectric anisotropy disposed between the base plates capable of being oriented to a first stable orientation state on one side and a second stable orientation state on the other side forming an angle 2Θ between the average molecular axes of said first and second stable orientation states in the absence of an electric field;
(b) matrix electrode means comprising a plurality of scanning lines and a plurality of information lines intersecting with the scanning lines;
(c) erasure pulse application means for applying an erasure pulse of one polarity exceeding on threshold of the ferroelectric smectic liquid crystal to the picture elements on all or prescribed scanning lines;
(d) writing pulse application means for applying a writing pulse of the other polarity exceeding the other threshold of the ferroelectric liquid crystal to a selected picture element on a selected scanning line;
(e) means for applying to the intersections of said scanning lines and information lines an alternating voltage in a non-selecting period which is insufficient to transform the ferroelectric smectic liquid crystal oriented from one to the other of the first and second orientation states but which is sufficient to provide a third stable orientation state and a fourth stable orientation state which form a larger angle than said angle 2Θ; and
(f) means for detecting an optical difference between light rays having passed through the ferroelectric smectic liquid crystal oriented to said third stable orientation state and light rays having passed through the ferroelectric smectic liquid crystal oriented to said fourth stable orientation state.

16. A liquid crystal optical apparatus according to claim 15, wherein said means for detecting an optical difference is a polarizer having a polarization axis substantially in parallel with the molecular axes of the ferroelectric smectic liquid crystal oriented to the third stable orientation state or the fourth stable orientation state.

17. A liquid crystal optical apparatus according to claim 15, wherein said means for detecting an optical difference comprises a pair of polarizers arranged in the form of cross nicols, one of the pair of polarizers having a polarization axis substantially in parallel with the molecular axes of the ferroelectric smectic liquid crystal oriented to the third stable orientation state or the fourth stable orientation state.

18. A liquid crystal optical apparatus according to claim 15, wherein said ferroelectric smectic liquid crystal is in chiral smectic C phase, H phase, I phase, G phase or F phase.

19. A liquid crystal optical apparatus, comprising:
(a) a liquid crystal cell comprising a pair of base plates and a ferroelectric smectic liquid crystal having a negative dielectric anisotropy disposed between the base plates capable of being oriented to a first stable orientation state on one side and a second stable orientation state on the other side forming an angle 2Θ between the average molecular axes of said first and second stable orientation states in the absence of an electric field;
(b) matrix electrode means comprising a plurality of scanning lines and a plurality of information lines intersecting with the scanning lines;
(c) writing pulse application means comprising means for applying a scanning selection signal and means for applying an information signal in synchronism with the scanning selection signal to said matrix electrode means, said writing pulse application means applying a first writing pulse of one polarity exceeding one threshold of the ferroelectric smectic liquid crystal to a selected picture element on a selected scanning line, and applying a second writing pulse of the other polarity exceeding the other threshold of the ferroelectric smectic liquid crystal to the other picture element on said selected scanning line;

(d) means for applying to the intersections of said scanning lines and information lines therebetween an alternating voltage in a non-selecting period but which which is insufficient to transform the ferroelectric smectic liquid crystal oriented from one to the other of the first and second orientation states but which is sufficient to provide a third stable orientation state and a fourth stable orientation state which form a larger angle than said angle $2\Theta$; and (e) means for detecting an optical difference between light rays having passed through the ferroelectric smectic liquid crystal oriented to said third stable orientation state and light rays having passed through the ferroelectric smectic liquid crystal oriented to said fourth stable orientation state.

20. A liquid crystal optical apparatus according to claim 19, wherein said first and second writing pulses are consecutively applied on a scanning line.

21. A liquid crystal optical apparatus according to claim 19, wherein said means for detecting an optical difference is a polarizer having a polarization axis substantially in parallel with the molecular axes of the ferroelectric smectic liquid crystal oriented to the third stable orientation state or the fourth stable orientation state.

22. A liquid crystal optical apparatus according to claim 19, wherein said means for detecting an optical difference comprises a pair of polarizers arranged in the form of cross nicols, one of the pair of polarizers having a polarization axis substantially in parallel with the molecular axes of the ferroelectric smectic liquid crystal oriented to the third stable orientation state or the fourth stable orientation state.

23. A liquid crystal optical device according to claim 19, wherein said ferroelectric smectic liquid crystal is in chiral smectic C phase, H phase, I phase, G phase or F phase.

* * * * *

UNITED STATES PATENT AND TRADEMARK OFFICE
CERTIFICATE OF CORRECTION

PATENT NO. : 4,898,456

DATED : February 6, 1990

INVENTOR(S) : SHINJIRO OKADA ET AL.

Page 1 of 3

It is certified that error appears in the above-identified patent and that said Letters Patent is hereby corrected as shown below:

COLUMN 2

Line 53, "a" (second occurrence) shuld read --an--.

COLUMN 3

Line 8, "illustrate" should read --illustrates--.
    Line 17, "illustrate" should read --illustrates--.
    Line 18, "pigure" should read --figure--.
    Line 28, "illustrate" should read --illustrates--.

COLUMN 5

Line 15, "been,.as" should read --been, as--.

COLUMN 7

Line 66, "men-" should be deleted.
    Line 67, "tioned" should be deleted.

COLUMN 12

Line 14, "{FIG. 14" should read --¶ FIG. 14--.
    Line 43, "shift resiter 161" should read
        --shift register 161--.

COLUMN 13

Line 1, "in" should be deleted. (2nd Occur.)

UNITED STATES PATENT AND TRADEMARK OFFICE
CERTIFICATE OF CORRECTION

PATENT NO. : 4,898,456

DATED : February 6, 1990

INVENTOR(S) : SHINJIRO OKADA ET AL.

Page 2 of 3

It is certified that error appears in the above-identified patent and that said Letters Patent is hereby corrected as shown below:

COLUMN 14

Line 30, "tagcs" should read --tages--.

COLUMN 15

Line 46, "time)" should read --(time)--.

COLUMN 16

Line 45, "in" should be deleted.

COLUMN 17

Line 10, "as" should read --a--.
Line 15, "of" should read --in--.
Line 31, "large" should read --larger--.
Line 33, "(d)" should read --(d)--.

COLUMN 18

Line 1, "liquid crystal cell" should read
--a liquid crystal cell--.
Line 47, "liquid crystal optical device" should read
--liquid crystal optical apparatus--.
Line 59, "lecular of" should read --lecular axes of--.

COLUMN 20

Line 5, "on" should read --one--.

UNITED STATES PATENT AND TRADEMARK OFFICE
CERTIFICATE OF CORRECTION

PATENT NO. : 4,898,456

DATED : February 6, 1990

INVENTOR(S) : SHINJIRO OKADA ET AL.

It is certified that error appears in the above-identified patent and that said Letters Patent is hereby corrected as shown below:

COLUMN 21

Line 9, "which" (first occurrence) should be deleted.

COLUMN 22

Line 19, "liquid crystal optical device" should read --liquid crystal optical apparatus--.

Signed and Sealed this

Tenth Day of September, 1991

Attest:

HARRY F. MANBECK. JR.

Attesting Officer

Commissioner of Patents and Trademarks